US012762125B1

(12) United States Patent
Shimizu et al.

(10) Patent No.: US 12,762,125 B1
(45) Date of Patent: Oct. 13, 2026

(54) GENERATIVE-AI SQL-GENERATION BASED ON NATURAL LANGUAGE INPUT

(71) Applicant: ABCS INSIGHTS Inc., Kissimmee, FL (US)

(72) Inventors: Jerome Shimizu, Kissimmee, FL (US); Michael Sheng, Orlando, FL (US)

(73) Assignee: ABCS INSIGHTS INC., Kissimmee, FL (US)

( * ) Notice: Subject to any disclaimer, the term of this patent is extended or adjusted under 35 U.S.C. 154(b) by 0 days.

(21) Appl. No.: 19/226,391

(22) Filed: Jun. 3, 2025

(51) Int. Cl.
*G06F 16/2455* (2019.01)
*G06F 16/242* (2019.01)
*G06Q 30/0251* (2023.01)

(52) U.S. Cl.
CPC ........ *G06F 16/2455* (2019.01); *G06F 16/242* (2019.01); *G06Q 30/0251* (2013.01)

(58) Field of Classification Search
CPC ...... G06F 16/438; G06F 9/4806; G06F 16/26; G06F 40/30; G06F 40/40; G06F 16/2455; G06F 16/242; G06Q 30/0251
USPC .......................................................... 707/769
See application file for complete search history.

(56) References Cited

U.S. PATENT DOCUMENTS

2025/0225146 A1* 7/2025 Rossi ...................... G06F 40/40
2025/0321967 A1* 10/2025 Strader ............ G06F 16/24553
2025/0335955 A1* 10/2025 Muthu .............. G06Q 30/0203

* cited by examiner

*Primary Examiner* — Hung T Vy
(74) *Attorney, Agent, or Firm* — SCHWEGMAN LUNDBERG & WOESSNER, P.A.

(57) ABSTRACT

Systems and methods are disclosed for generating customized advertising audiences using artificial intelligence. The system analyzes a request for a desired audience, input through a natural language chat interface or the like, and automatically converts that input into structured traits and a database query based on the structured traits. A large language model (LLM) is used to analyze the request to extract meaningful characteristics (like age, behavior, or shopping patterns) and generate a structured query language (SQL) command to identify matching users in a database. The system can then deliver content to the matching users users or update marketing strategies based on performance.

20 Claims, 8 Drawing Sheets

GENERATIVE-AI SQL-GENERATION BASED ON NATURAL LANGUAGE INPUT

BACKGROUND

Content exposure technology measures whether and how users interact with advertisements across various mediums, including digital, out-of-home, in-store, and broadcast channels. These systems estimate content reach and effectiveness. Content exposure technology plays a crucial role in advertising analytics by tracking when, where, and how users encounter content across multiple platforms. These technologies help attribute conversions to specific marketing touchpoints, distinguishing between direct and indirect influences on user behavior.

BRIEF DESCRIPTION OF THE SEVERAL VIEWS OF THE DRAWINGS

In the drawings, which are not necessarily drawn to scale, like numerals may describe similar components in different views. To identify the discussion of any particular element or act more easily, the most significant digit or digits in a reference number refer to the figure number in which that element is first introduced. Some non-limiting examples are illustrated in the figures of the accompanying drawings in which.

DETAILED DESCRIPTION

Figure 1:
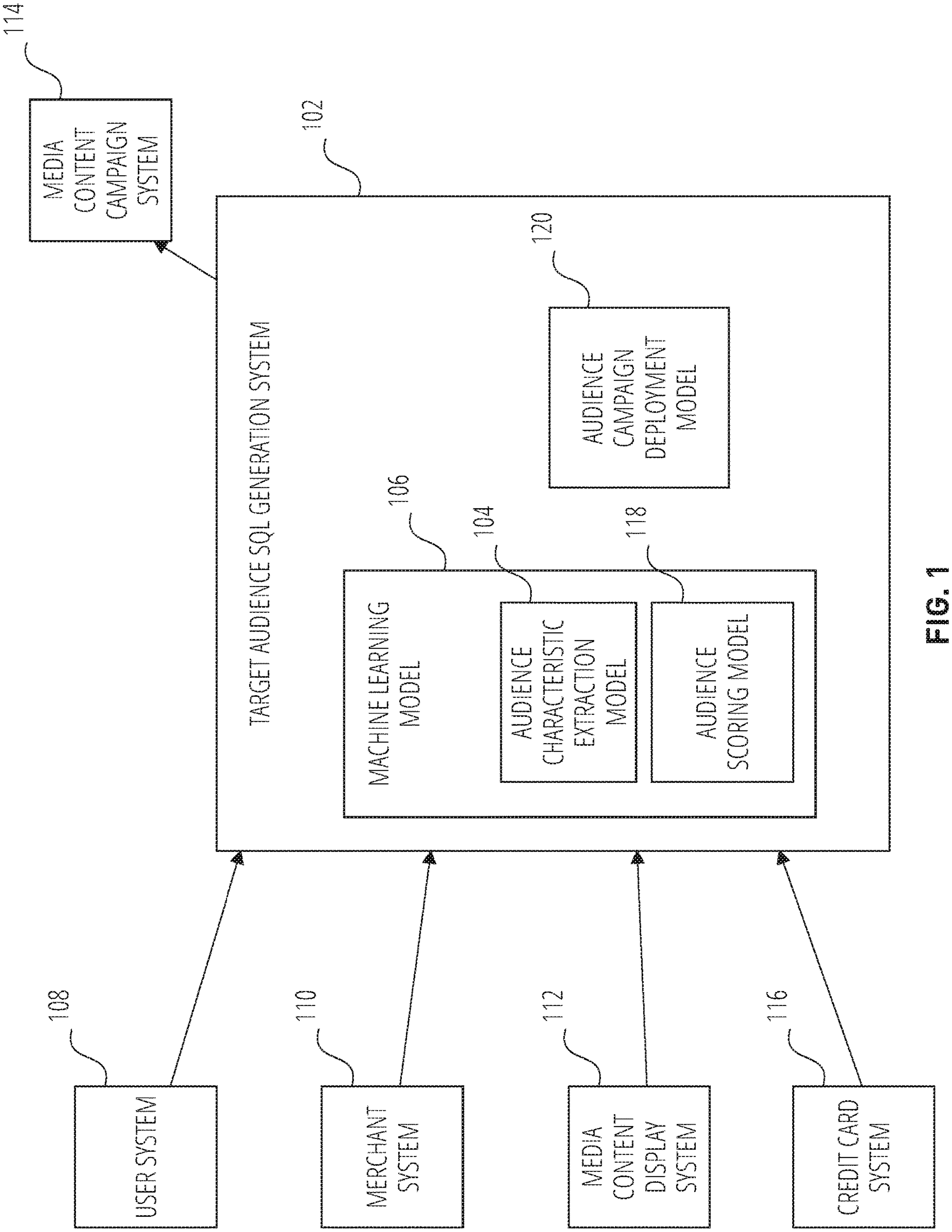
FIG. 1 illustrates an example system architecture for translating natural language audience requests into structured query language (SQL) queries and generating real-time audience segments for media targeting, according to some examples.

Traditional advertising systems often rely on prebuilt or syndicated audience segments, which are broad, static, and infrequently updated. These audience lists are typically constructed using generalized demographic or behavioral data, such as age range, gender, household income, or past purchasing history. While these datasets offer a starting point for ad targeting, they fail to capture the nuance or specificity that modern advertisers increasingly demand. As a result, many campaigns rely on approximations rather than precise intent-based profiles, leading to wasted spend and diluted impact.

Another major limitation of traditional systems is their dependency on manual intervention. Advertisers must often work with data analysts or third-party vendors to define their target audiences, translate marketing goals into SQL logic, and execute complex segmentation strategies. This process can be slow, resource-intensive, and prone to human error. Even small adjustments to audience definitions may require days or weeks to implement, making real-time optimization effectively impossible in many cases.

Furthermore, these systems generally lack the ability to synthesize user intent from natural language. An advertiser who knows their audience conceptually-such as "young professionals who shop at organic grocery stores and use public transit"-cannot easily translate that idea into actionable database queries without technical assistance. This creates a gap between marketing strategy and execution, preventing direct control and slowing down iteration cycles.

Traditional platforms also provide limited flexibility in generating highly customized segments. If a marketer wants to build a bespoke audience based on a mix of purchase patterns, geographic movement, brand affinities, or contextual triggers (such as time of day or seasonal trends), they are often constrained by rigid template fields or predefined categories that fail to account for these multi-dimensional factors.

Finally, many existing systems do not support meaningful tools in the creation or evaluation of custom audience models. The existing systems are not equipped to autonomously generate, test, and refine segmentation logic based on historical campaign performance, emerging product launches, or competitive market shifts. This lack of dynamic adaptability leads to stale audience definitions that do not evolve with consumer behavior or business goals.

Embodiments of the target audience SQL generation system disclosed herein address and overcome the limitations of existing systems by enabling dynamic, fine-grained, and intent-driven audience generation directly from natural language inputs.

In some examples, the target audience SQL generation system receives a conceptual audience description directly from a user—such as "young professionals in New York who shop at organic markets and commute by subway"—and uses a large language model (LLM) to interpret and transform this request into structured audience characteristics. These structured characteristics include identifiable traits (e.g., age range, region), behavioral indicators (e.g., merchant type, shopping frequency), and contextual qualifiers (e.g., time of day, device usage).

In some examples, the target audience SQL generation system bypasses the need for prebuilt syndicated segments by enabling real-time creation of custom audiences that align more closely with the advertiser's evolving objectives. Unlike legacy systems that depend on manual SQL scripting by data teams, the LLM automatically generates executable SQL queries or audience scoring algorithms that can be directly applied to user databases to extract matching user subsets. This allows advertisers to go from idea to deployment in minutes instead of days or weeks.

In some examples, the target audience SQL generation system reduces human error and labor bottlenecks by providing translation from natural language to query logic. The target audience SQL generation system allows marketers—regardless of technical skill—to directly express targeting goals through a chatbot, graphical interface, voice-to-text system, or API, which are then interpreted and acted upon by the target audience SQL generation system's LLM-based engine.

In some examples, the target audience SQL generation system also supports personalization and scale. Rather than relying on static rules or templates, the target audience SQL generation system can generate specialized audience models tailored to new products, evolving campaign objectives, or contextual factors like seasonal demand. The audience scoring model further applies statistical weighting or machine learning logic to refine targeting, assigning higher priority to users with greater behavioral alignment.

In some examples, the target audience SQL generation system also supports dynamic feedback and optimization. By integrating downstream analytics from campaign results, the audience campaign deployment model can suggest improvements or generate new audience definitions based on what segments respond best, effectively closing the loop between strategy and performance.

By combining natural language processing, real-time query generation, and dynamic audience scoring, the target audience SQL generation system significantly improves upon traditional methods-enabling faster audience creation, greater customization, higher precision, and deeper integration between marketing intent and technical execution.

System Architecture for Natural Language-Based Audience Generation and SQL Execution FIG. 1 illustrates an example system architecture for translating natural language audience requests into SQL queries and generating real-time audience segments for media targeting, according to some examples. The system includes a target audience SQL generation system 102 that interfaces with various external data systems to ingest, interpret, and correlate inputs such as user descriptions, behavioral data, structured user profiles, merchant records, and transaction histories. Using integrated modeling components-including a machine learning model 106, an audience characteristic extraction model 104, an audience scoring model 118, and an audience campaign deployment model 120—the system identifies relevant traits from user—provided descriptions, converts those traits into structured audience characteristics, and generates executable SQL queries for identifying targetable users within a database.

In some examples, the target audience SQL generation system 102 communicates with a user system 108 (e.g., an advertiser portal or input device), a merchant system 110 (e.g., retail preference or point-of-sale metadata), a media content display system 112 (e.g., user interface or API layer for receiving the audience description), and a credit card system 116 (e.g., financial and behavioral transaction logs). In some examples, the system also communicates with a media content campaign system 114, which receives the identified audience list and corresponding SQL logic for execution in a downstream advertising or marketing platform.

In some examples, target audience SQL generation system 102 interprets advertiser input, translates audience intent into machine-readable queries, and orchestrates the identification and delivery of highly customized target user groups for advertising purposes. The target audience SQL generation system 102 serves as the central decision engine that integrates natural language processing, machine learning-based audience modeling, and query execution infrastructure to generate real-time, intent-based audience segments.

In some examples, target audience SQL generation system 102 receives natural language audience requests through a chatbot interface or structured input field. These audience requests include generalized descriptions or behavioral observations such as "I want to reach new mothers who shop at ABC grocery store" or "target Gen Z gamers who recently downloaded a fitness app." Target audience SQL generation system 102 transmits this input (and/or a derivative thereof) to machine learning model 106 for structured interpretation and processing.

In some examples, target audience SQL generation system 102 invokes a machine learning model 106 to transform the user input into structured audience characteristics. These characteristics represent identifiable user traits, demographic indicators, behavioral markers, purchasing patterns, and contextual signals that are necessary to define the desired audience. The structured format includes fielded parameters (e.g., age: 18-25, app_category: gaming, device_type: mobile), weighted scoring models, or filtering logic.

In some examples, after generating structured audience characteristics, the target audience SQL generation system 102 receives a request to generate a SQL query from machine learning model 106. This request prompts the generation of SQL logic that incorporates the extracted audience characteristics as WHERE clause conditions, JOINs across data tables, and optional logic for limits, sorting, or audience size constraints. The target audience SQL generation system 102 receives the finalized SQL query code and routes it to the underlying user database for execution.

In some examples, target audience SQL generation system 102 executes the SQL query against a database comprising user identifiers, behavioral metadata, purchasing logs, app usage events, and demographic segmentation data. The execution identifies a subset of users that meet the criteria defined in the structured audience characteristics. These selected users represent the actionable target segment that can be used for downstream advertising purposes.

In some examples, target audience SQL generation system 102 interfaces with media content campaign system 114 to transmit the identified user list or associated targeting metadata. This enables the system to activate campaigns, refine targeting rules, or initiate bidding in real-time media environments. The target audience SQL generation system 102 receives campaign performance feedback (e.g., conversion rates, engagement scores) from media content campaign system 114 to improve future audience generation through continuous learning and optimization loops.

In some examples, The target audience SQL generation system 102 handles auxiliary functions such as user ID matching by mapping hashed identifiers (e.g., device IDs, cookie IDs) to platform-specific formats used by ad delivery systems, performs audit logging such as storing the original user request, generated audience characteristics, and executed SQL queries for compliance or debugging purposes, performs permission checks such as validating data access rights or restrictions based on data governance policies, privacy constraints, or advertiser configurations, and/or performance monitoring such as tracking SQL execution time, match rates, and latency to ensure that audience generation operates within acceptable service-level targets.

In some examples, the machine learning model 106 is stored within the target audience SQL generation system 102. The machine learning model 106 processes user inputs, interprets natural language, generates structured audience traits, scores users, and enables precise targeting based on real-time audience definitions. The machine learning model 106 is trained on a large corpus of historical audience requests, behavioral data, campaign performance outcomes, and user response patterns to ensure high accuracy in predicting user intent and audience relevance.

In some examples, the machine learning model 106 incorporates advanced natural language processing (NLP) techniques to understand the user's audience request input, which may describe general characteristics, shopping behaviors, or demographic interests of a desired user segment. The machine learning model 106 converts this unstructured input into structured data representations using an embedded audience characteristic extraction model 104.

In some examples, the machine learning model 106 applies inference logic and scoring methodologies—via the audience scoring model 118—to evaluate and rank users in the database based on how well they match the structured audience characteristics derived from the input. The audience scoring model 118 can also integrate probabilistic modeling or weighting strategies to quantify user similarity, likelihood of interest, or expected conversion potential.

In some examples, the machine learning model 106 includes a downstream execution layer that integrates with an audience campaign deployment model 120, which uses the structured output of the model to configure, deploy, and optimize media campaigns across advertising platforms. This enables advertisers to dynamically translate natural language descriptions into actionable media execution pipelines without requiring manual audience modeling or predefined segments.

In some examples, the machine learning model 106 continually retrains on live data, user feedback, and campaign results to improve the quality of its audience predictions and scoring accuracy. The retraining process adapts the model to evolving language patterns, market conditions, product categories, and emerging behavioral trends, ensuring that audience creation remains contextually relevant and data-driven.

In some examples, the audience characteristic extraction model 104 is a submodule of the machine learning model 106 within the target audience SQL generation system 102. The audience characteristic extraction model 104 translates unstructured audience requests-such as requests received in the form of freeform natural language-into structured, machine-interpretable audience characteristics that can be used for downstream querying and targeting.

In some examples, the audience characteristic extraction model 104 receives an audience request from the user system 108, such as "urban moms who buy organic snacks and shop at ABC grocery store." The model applies natural language processing (NLP) techniques to parse the request and identify one or more structured audience characteristics. These characteristics may include fields such as demographic attributes (e.g., "female," "parent," "urban"), behavioral traits (e.g., "purchases organic snacks"), merchant interactions (e.g., "shops at ABC grocery store"), or contextual filters (e.g., "recent activity," "high-spending").

In some examples, the audience characteristic extraction model 104 outputs these characteristics in a structured format that includes field names, value ranges, match operators, weights, and scoring parameters. For example, the model might represent the parsed characteristics as:

{field: "merchant", operator: "=", value: "ABC grocery store", weight: 0.9}

{field: "product_category", operator: "includes", value: "organic snacks", weight: 0.8}

{field: "location_type", operator: "=", value: "urban", weight: 0.7}

In some examples, the audience characteristic extraction model 104 is trained on a combination of labeled natural language samples, historical user queries, prior audience definitions, and campaign performance feedback. This training enables the model to handle ambiguity, misspellings, varied phrasing, and implicit meanings—for instance, recognizing that "eco-conscious shoppers" is likely correlated with categories such as "organic," "recyclable," or "sustainable products."

In some examples, the model supports both deterministic and probabilistic interpretation techniques. Deterministic logic ensures that clearly stated characteristics are mapped precisely, while probabilistic inference allows the model to expand and refine user intent by suggesting additional inferred traits based on past model training, user cohorts, or campaign similarity.

In some examples, the audience characteristic extraction model 104 enables modular output formatting, allowing structured characteristics to be used not only for SQL query generation but also for other applications such as scoring models, campaign simulation, or lookalike audience expansion. The model's ability to structure and standardize freeform input into data-ready components forms the critical foundation for generating executable queries and high-fidelity audience profiles.

In some examples, the audience scoring model 118 is a machine learning submodule of the machine learning model 106 within the target audience SQL generation system 102. The audience scoring model 118 assigns scores to individual users in a user database based on how well those users match the structured audience characteristics generated by the audience characteristic extraction model 104.

In some examples, the audience scoring model 118 receives the structured audience characteristics, such as demographic, behavioral, geographic, or contextual attributes, and compares them against records stored in one or more databases accessible through the user system 108, merchant system 110, or credit card system 116. Each record may include features such as historical purchase patterns, store visitation data, product preferences, media exposure, and loyalty program activity.

In some examples, the audience scoring model 118 uses one or more predictive models to compute a probability or confidence score that a given user matches the desired audience profile. These predictive models include logistic regression, gradient boosted decision trees, or neural networks trained to output a match likelihood between 0 and 1. For example, a user who has repeatedly purchased organic baby products, shops at a set of premium grocery stores, and resides in a metropolitan ZIP code may be scored highly if the desired audience profile includes "urban millennial parents who prefer organic brands."

In some examples, the audience scoring model 118 integrates field-level weights from the structured audience characteristics outputted by the audience characteristic extraction model 104. These weights adjust the importance of specific traits when computing the overall user score. For instance, if the advertiser emphasizes "frequent shopper" behavior more heavily than "urban location," the model applies greater weight to relevant behavioral signals.

In some examples, the audience scoring model 118 incorporates historical campaign performance feedback to improve future audience selection. If prior campaigns targeting users with similar traits produced strong results, the scoring model dynamically adjusts its parameters to prioritize those traits more heavily. Conversely, traits associated with poor campaign performance can be down-weighted in future runs.

In some examples, the audience scoring model 118 supports rule-based thresholds and rank-based output. The audience scoring model 118 can return:

- A ranked list of top-scoring users for media activation
- A filtered list of users exceeding a minimum score threshold (e.g., score >0.85)·
- Audience aggregates for downstream analytics, such as distribution by income, region, or retailer In some examples, the scores computed by the audience scoring model 118 are stored temporarily or persistently, enabling reuse for other campaigns, A/B testing, audience lookalike generation, or reporting purposes. These scores serve as an intermediary layer between the natural language audience request and final media delivery, ensuring that audience selection is both data-driven and aligned with advertiser intent.

In some examples, the audience campaign deployment model 120 transforms the scored audience subset-identified by the audience scoring model 118—into an actionable campaign deployment plan for delivery through the media content campaign system 114.

In some examples, the audience campaign deployment model 120 receives, as input, a list of user identifiers associated with high audience scores, along with corresponding metadata such as score thresholds, field-level match strengths, and optional advertiser constraints (e.g., budget, region, frequency cap). Using this input, the audience campaign deployment model 120 generates structured deployment instructions that specify which users should be targeted, through which media channels, during which timeframes, and with which creative variations.

In some examples, the audience campaign deployment model 120 supports campaign customization logic based on user traits or segment assignments. For example, users with high brand affinity scores may receive personalized messaging, while users identified as high-frequency purchasers may be assigned to limited-time offers. The model aligns each audience subset with the appropriate targeting instructions, message templates, or channel-specific formats required by the media content campaign system 114.

In some examples, the audience campaign deployment model 120 incorporates campaign-level constraints and optimization objectives provided by the advertiser. These constraints include:

- Budget allocation rules across regions or demographics
- Frequency caps per user ID or household
- Prioritization of specific platforms (e.g., mobile over desktop)
- Performance optimization targets (e.g., conversion rate, reach, CPM)

The audience campaign deployment model 120 uses these constraints to generate campaign instructions that optimize targeting efficiency while maintaining compliance with delivery constraints. For example, if the advertiser specifies a maximum spend in a particular ZIP code, the model limits the number of targetable users in that region and redistributes surplus budget to higher-performing areas.

In some examples, the audience campaign deployment model 120 interfaces with external campaign execution platforms via the media content campaign system 114. This includes formatting the output into deployment-ready structures such as platform-specific targeting lists, creative assignment matrices (e.g., assigning ad variant A to Segment 1), real-time bidding parameters (e.g., bid floors, auction types), reporting configurations (e.g., test/control group flags, KPI monitoring tags), and/or the like.

In some examples, the audience campaign deployment model 120 receives real-time or batch performance feedback from the media content campaign system 114, such as impressions served, click-through rates, conversions, or other engagement signals. The model uses this data to refine future campaign recommendations and feed performance data back into the audience scoring model 118 and audience characteristic extraction model 104 for retraining, adjustment, or optimization.

In some examples, the audience campaign deployment model 120 maintains a campaign instruction history and deployment metadata log to support transparency, compliance, and auditability. This log includes timestamps, campaign names, target segments, creative assignments, and any constraints applied at deployment time. These records help track campaign efficacy and support post-campaign analytics and attribution.

In some examples, the user system 108 collects, generates, or aggregates structured behavioral or transactional data associated with individual users. The target audience SQL generation system 102 accesses this data to help define, score, and validate users who match a desired audience profile.

In some examples, the user system 108 includes consumer-facing applications and platforms that store user activity, such as mobile apps, loyalty programs, e-commerce platforms, receipt capture tools, email inbox parsers, survey platforms, or digital wallets. These systems generate structured datasets reflecting individual-level activity and characteristics, which may include fields such as user ID, timestamp, product interactions, website clicks, browsing history, and previous purchases.

In some examples, the user system 108 transmits user activity data to the target audience SQL generation system 102 either continuously in real-time or in periodic batch uploads. Transmission methods include application programming interface (API) integrations, secure file transfers (e.g., SFTP), or direct data lake access.

In some examples, the data accessed from the user system 108 enables the machine learning model 106 to understand the behavior and traits of each user. For instance, the audience characteristic extraction model 104 analyzes attributes such as product purchase frequency, brand affinity, location history, or engagement with promotional emails to build structured characteristics for audience targeting. Similarly, the audience scoring model 118 uses historical user activity records to assign scores based on predicted responsiveness to the requested campaign.

In some examples, the data from user system 108 includes:

- Purchase history, including itemized receipts
- Loyalty card usage and reward point accumulation Survey responses (e.g., brand preference, lifestyle choices)
- Website or app session logs (e.g., visited pages, session duration)
- Email interactions (e.g., opens, clicks, opt-outs)
- Social sharing behavior
- Device metadata (e.g., platform type, mobile vs desktop)

In some examples, the target audience SQL generation system 102 uses this data to generate and execute SQL queries that select a subset of users from the overall database population. This user subset represents those who match the structured audience characteristics derived from the advertiser's natural language request.

In some examples, the user system 108 supports data enrichment or identity resolution workflows by unifying different identifiers (e.g., device IDs, hashed emails, loyalty IDs) into a consistent user profile. This resolved user view enhances the targeting precision of the SQL queries generated by the machine learning model 106.

In some examples, the user system 108 acts as both a source of raw behavioral data and a feedback channel. For example, after an ad campaign is deployed to a user, the system may monitor subsequent behavior (e.g., product purchase, page visit) and send conversion signals back to the target audience SQL generation system 102 to close the loop and retrain underlying models.

By serving as the primary source of user-level input data, the user system 108 enables the rest of the platform to define, evaluate, and activate high-quality audience segments based on real-world behavioral signals.

In some examples, the merchant system 110 tracks merchant-related data connected to users, including physical store locations, merchant categories, inventory or promotional details, and store visitation signals. The target audience SQL generation system 102 accesses this data to incorporate merchant-specific attributes into audience profiles and scoring logic.

In some examples, the merchant system 110 includes data feeds from merchant-operated platforms (e.g., point-of-sale systems, loyalty programs), third-party aggregators (e.g., geofencing services, retail data providers), or public directories (e.g., store hours, locations, and categories). The data may include structured records detailing where, when, and how users interact with specific retail environments.

In some examples, the target audience SQL generation system 102 uses merchant system 110 to identify which users have visited or transacted with certain merchants. For instance, data from geofencing providers or in-store Wi-Fi networks can confirm whether a user entered a physical store, how long they stayed, and which departments they visited. The machine learning model 106 uses such data to enhance the relevance of the audience characteristics and scoring.

In some examples, the merchant system 110 supplies the following types of data:

- Store identifiers and brand names
- Merchant category codes (MCC)
- Location coordinates (latitude/longitude)
- Dwell time at store location
- Promotional offers and in-store event data
- Inferred visit frequency patterns
- Aggregated footfall volumes by store In some examples, the audience characteristic extraction model 104 uses this merchant-related data to define audience traits based on shopping preferences or visitation history, such as "frequent shoppers at upscale grocery stores" or "visitors to home improvement retailers within the past 30 days." These merchant-specific behaviors are incorporated into the structured audience characteristics generated from the natural language input.

In some examples, the audience scoring model 118 uses signals from merchant system 110 to adjust the relevance of each user to the intended audience. For example, if a user has visited three different electronics retailers within one month, the scoring model may increase their likelihood of being interested in a new tech product campaign.

In some examples, the merchant system 110 supports integration with real-time location services or historical foot traffic data providers. This enables the target audience SQL generation system 102 to not only target users based on confirmed past visits but also predict future interest based on movement trends.

In some examples, the merchant system 110 includes merchant loyalty platform data that links users to merchants with whom they have rewards accounts, active coupons, or email subscriptions. These associations can be used to enrich the SQL queries executed by the target audience SQL generation system 102, increasing the precision of audience selection.

In some examples, the media content display system 112 provides data about advertisements, promotional messages, branded content, or sponsored materials that were delivered across physical or digital environments. The target audience SQL generation system 102 accesses this data to link specific audience characteristics or user IDs to known content exposures.

In some examples, the media content display system 112 includes logs or metadata from sources such as connected television (CTV) platforms, streaming video services, mobile ad networks, in-store digital signage controllers, email marketing systems, or publisher ad servers. This content metadata may describe when, where, and to whom an advertisement or piece of media was shown.

In some examples, the media content display system 112 stores the following information:

- Media content identifiers (e.g., ad campaign ID, creative ID)
- Content format (e.g., video, static image, carousel, text)
- Delivery timestamps and time windows
- Targeted audience segments (if known)
- Media placement details (e.g., app name, channel, publisher, store location, or platform)
- Estimated impressions or views
- Creative metadata (e.g., product category, promotional messaging)

In some examples, the target audience SQL generation system 102 uses the data provided by media content display system 112 to determine which types of content were delivered to different platforms or users and map these events to later outcomes or audience scoring logic.

In some examples, the audience characteristic extraction model 104 references this media delivery data to infer user intent or product familiarity. For example, if a user was exposed to a campaign about organic snacks across multiple video streaming apps, the system may add a structured audience characteristic such as "recently exposed to organic food messaging."

In some examples, the audience scoring model 118 increases the match score of a user to a given audience segment based on their content exposure history, which is derived from records received from the media content display system 112. This supports retargeting or reinforcement strategies based on multi-touch exposure profiles.

In some examples, the media content display system 112 includes dynamic ad insertion logs or content rotation schedules, which enable the system to determine which creative variant was served to a particular region, device type, or inferred demographic cohort. This data is used to personalize audience segments based on known brand interactions.

In some examples, the target audience SQL generation system 102 uses this media content delivery information to fine-tune the SQL query logic for user targeting, including filtering for users who received a given ad campaign or excluding users who have already been exposed to a specific brand message.

By supplying advertising delivery and media exposure data, the media content display system 112 enables the platform to enrich audience modeling with content interaction history, supporting both prospecting and re-engagement use cases.

In some examples, the credit card system 116 stores, processes, or aggregates payment transaction data associated with user credit card or debit card activity. The target audience SQL generation system 102 accesses this transaction data to support audience definition, enrichment, and scoring based on verified purchase behavior.

In some examples, the credit card system 116 includes data from payment networks (e.g., Visa, Mastercard, American Express), financial institutions (e.g., issuing banks), third-party aggregators (e.g., Plaid, Yodlee), and digital wallets (e.g., Apple Pay, Google Pay, Samsung Pay). These systems maintain structured logs of financial transactions performed by users across both online and in-store environments.

In some examples, the credit card system 116 provides the following types of structured data to the target audience SQL generation system 102:

- Timestamp of each transaction
- Merchant name and location
- Transaction amount
- Payment method (e.g., credit card, debit card, digital wallet)
- Merchant category code (MCC) or vertical classification
- Anonymized or pseudonymized user identifiers
- Card type (e.g., rewards, business, personal)

In some examples, the target audience SQL generation system 102 uses transaction log data from the credit card system 116 to validate and enrich the behavioral observations contained in a user's audience profile. For example, if a user input includes a request to target "users who shop at organic grocery stores," the audience characteristic extraction model 104 references merchant and MCC data from the credit card system 116 to identify users with qualifying purchase history.

In some examples, the audience scoring model 118 increases the likelihood score for a user belonging to a desired audience segment if the user has exhibited repeat spending behavior at merchants associated with the brand or category of interest. This scoring operation relies on financial records received from the credit card system 116.

In some examples, the credit card system 116 supplies temporal purchase patterns that support time-sensitive targeting. For example, if the user request describes targeting "holiday shoppers" or "recent restaurant visitors," the audience characteristic extraction model 104 analyzes time-stamped transactions from the credit card system 116 to identify relevant candidates.

In some examples, the target audience SQL generation system 102 integrates data from the credit card system 116 with data from the user system 108 (e.g., receipts or loyalty data) to triangulate purchasing activity and increase the reliability of inferred audience traits. This multi-source integration allows the system to filter out incomplete, duplicate, or ambiguous records and generate more accurate SQL queries.

By incorporating purchase signals from the credit card system 116, the platform enables advertisers to define audiences based on verified spending behavior, merchant affinity, or purchase frequency, and to prioritize targeting strategies that are grounded in high-confidence transaction data.

In some examples, the media content campaign system 114 receives targeting directives, audience lists, and campaign optimization instructions from the target audience SQL generation system 102. The media content campaign system 114 manages the execution of advertising campaigns across various distribution channels, including digital, social, mobile, connected television (CTV), and programmatic display networks.

In some examples, the media content campaign system 114 receives structured outputs from the audience campaign deployment model 120, which include SQL query results representing a subset of users identified as the desired target audience. These outputs may take the form of user identifiers (e.g., hashed emails, mobile ad IDs, IP address ranges) that are ingestible by advertising platforms.

In some examples, the media content campaign system 114 stores and manages campaign configuration metadata, including:

- Audience segment identifiers and targeting rules
- Channel-specific creative assets
- Budget allocations and bidding strategies
- Frequency caps and pacing rules
- Campaign start and end dates
- Regional or demographic targeting constraints
- Performance benchmarks and reporting thresholds In some examples, the media content campaign system 114 executes media buying transactions through one or more integrated ad servers, demand-side platforms (DSPs), or content management systems. These integrations enable real-time or near-real-time ad placement using the audience segments generated by the target audience SQL generation system 102.

In some examples, the media content campaign system 114 receives performance telemetry (e.g., impressions, clicks, conversions, cost-per-action) associated with the deployed campaigns and transmits this data back to the audience campaign deployment model 120 for feedback learning. This enables continuous audience refinement based on actual user engagement metrics.

In some examples, the media content campaign system 114 supports audience versioning or A/B testing workflows. For instance, it may run two parallel campaigns targeting slightly different audience definitions (e.g., "recent pet product purchasers" vs. "frequent pet store visitors") and report back relative performance data to the target audience SQL generation system 102 for model evaluation.

In some examples, the media content campaign system 114 stores historical campaign logs, which are used by the machine learning model 106 to improve future audience generation and targeting recommendations. These logs can be filtered by time period, product vertical, geography, or user segment to identify high-performing audience profiles.

In some examples, the media content campaign system 114 triggers real-time campaign updates based on revised audience data. For example, if the audience campaign deployment model 120 produces a refined SQL query that identifies a more accurate audience segment, the media content campaign system 114 can swap out audience lists mid-flight, without pausing or restarting the campaign.

By executing and managing campaigns based on real-time audience signals produced by the target audience SQL generation system 102, the media content campaign system 114 helps advertisers maximize media efficiency, improve return on ad spend (ROAS), and maintain alignment between ad delivery and evolving consumer intent.

Large Language Model-Driven Audience Segmentation and Query Execution

Figure 2:
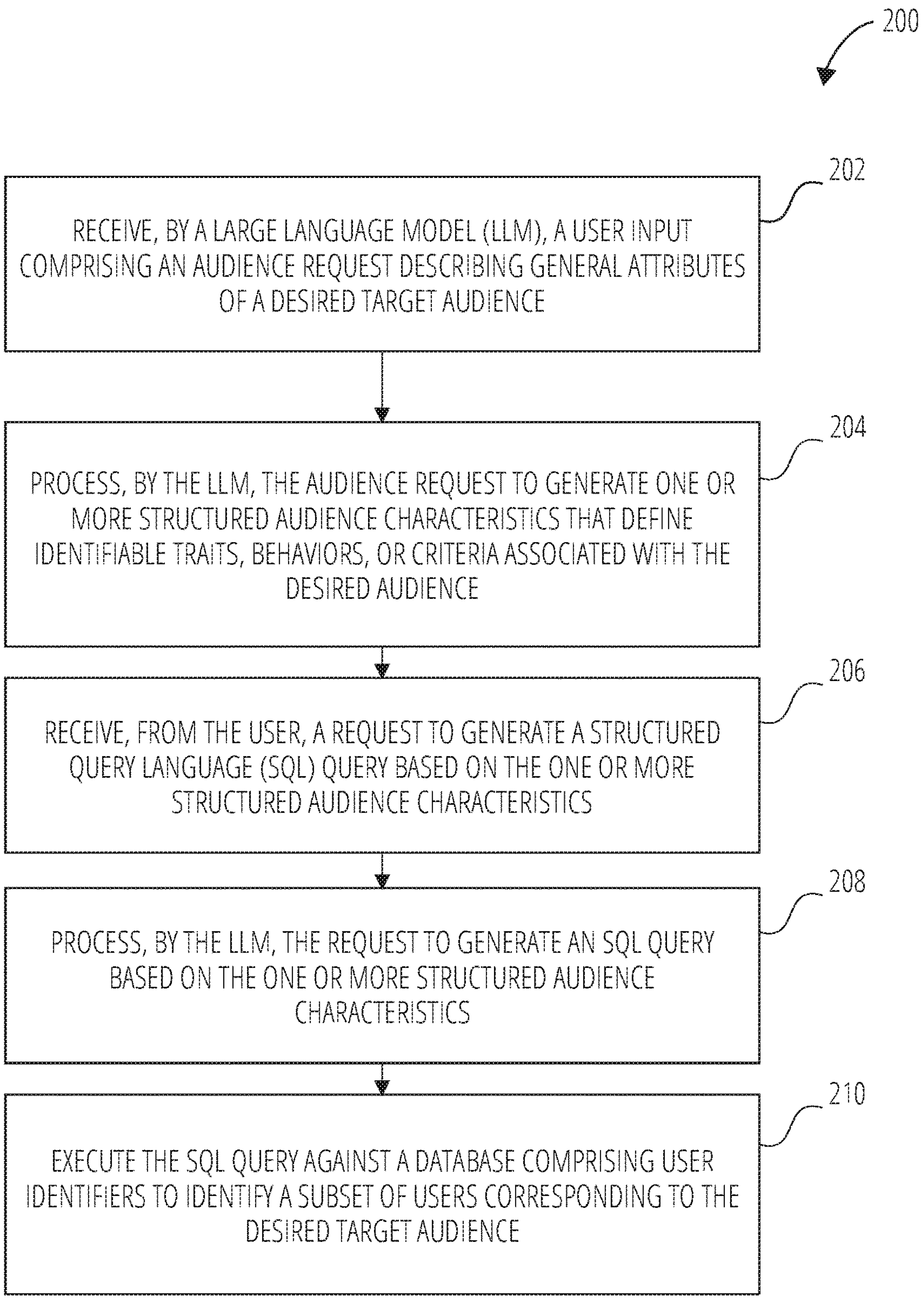
FIG. 2 illustrates an example routine 200 for large language model-driven audience segmentation and query execution for targeted advertising according to some examples.

FIG. 2 illustrates an example routine 200 for large language model-driven audience segmentation and query execution for targeted advertising according to some examples. Although the example routine 200 depicts a particular sequence of operations, the sequence may be altered without departing from the scope of the present disclosure. For example, some of the operations depicted may be performed in parallel or in a different sequence that does not materially affect the function of the routine 200. In other examples, different components of an example device or system that implements the routine 200 may perform functions at substantially the same time or in a specific sequence.

At block 202, the target audience SQL generation system 102 receives an audience request describing general attributes of a desired target audience. For example, a user via a user system 108 can generate the audience request describing general aspects of a desired target audience. The user system 108 sends the audience request to the target audience SQL generation system 012.

In one example, the input includes an audience request that describes general attributes of a desired target audience using natural language or other expressive formats. This user input represents an advertiser's high-level intent—such as targeting specific demographic groups, behavioral patterns, or interest-based cohorts—but without requiring the advertiser to use formal query syntax or structured data fields.

The LLM parses the audience request and generates a semantic interpretation of the advertiser's intent For example, the audience request is treated as a natural language prompt and the LLM? transforms the audience request into structured, machine-readable representations in downstream processing.

The user input includes general attributes such as:

Demographic details (e.g., "millennials," "parents with toddlers," "Spanish-speaking users")

Behavioral patterns (e.g., "frequent online shoppers," "people who visit gyms")

Purchase history (e.g., "users who recently bought luxury skincare products")

Geolocation constraints (e.g., "residents of Los Angeles metro area")

Temporal filters (e.g., "activity in the past 30 days")

Intent indicators (e.g., "interested in electric vehicles," "planning a vacation")

In some examples, the user provides the audience request through a chatbot interface or a graphical user interface (GUI) connected to the target audience SQL generation system 102. The input may be received as free-form text (e.g., "I want to reach recent college graduates who buy energy drinks and live in Austin") or through other modalities, such as voice-to-text transcription, structured dropdown menus, or API calls from external systems.

In some examples, the LLM processes the prompt which may contain free-form expressions of audience intent, such as "young professionals in New York who recently bought protein powder," or "tech-savvy retirees looking for travel deals." This allows users—such as marketers, media buyers, or campaign managers—to articulate their targeting criteria without needing to understand database schemas, formal logic, or query languages.

In some examples, the system supports alternative input modalities in addition to free-form text. For instance, the user input may be submitted through a voice-to-text interface, allowing verbal descriptions to be transcribed and routed to the LLM for further processing. In other implementations, the user submits a structured JSON object that encodes demographic, geographic, or behavioral targeting preferences using a pre-defined schema. Such structured inputs may originate from graphical user interfaces (GUIs) that guide the user through dropdown menus, tag selectors, or sliders, as well as programmatic interfaces (APIs) integrated with external ad platforms, media buying systems, or campaign configuration engines.

In some examples, the target audience SQL generation system 102 enhances the interpretation of the input prompt by accessing historical user interaction data, including prior prompts, recent campaign activity, or stored user preferences. This allows the system to apply contextual understanding when generating downstream audience characteristics. For example, if a user previously created an audience for "parents with young children in urban areas," and the current prompt says "let's now focus on similar users but in rural markets," the system can infer relevant continuity between the two sessions. This persistent context enables more intuitive, conversational audience generation across multiple user sessions.

In some examples, the target audience SQL generation system 102 receives user input that includes general audience attributes expressed in natural language, which describe key traits, behaviors, or preferences associated with the desired target audience. These attributes may include specific indicators such as purchase behavior (e.g., "people who frequently buy snacks"), brand preference (e.g., "loyal to Brand X"), shopping location (e.g., "shops at discount grocery chains"), income level (e.g., "upper-middle-class earners"), or age range (e.g., "millennials aged 25-34"). The system interprets these descriptors as part of the user's targeting goal and prepares them for structured modeling through downstream modules.

In some examples, the target audience SQL generation system 102 includes or interfaces with a generative artificial intelligence (GenAI) module that has been pre-trained on datasets and prompts specific to audience targeting scenarios. This specialized model is designed to interpret vague or open-ended descriptions and produce structured targeting characteristics optimized for downstream audience scoring and SQL generation. For instance, a GenAI model trained on historical campaign data may more effectively translate a phrase like "eco-conscious Gen Z buyers in urban areas" into multiple weighted behavioral criteria, including online browsing of sustainability blogs, purchase of reusable products, and residence in metropolitan ZIP codes.

In some examples, the user input includes intent-based attributes, which describe behavioral signals inferred from user actions or preferences. These may include phrases such as "likely to travel in the next 30 days," "frequent moviegoer," or "plans to purchase a car soon." The target audience SQL generation system 102 processes these intents as high-level proxies for actionable traits, converting them into structured criteria such as travel bookings, movie ticket purchases, or vehicle-related search history. The resulting attributes are incorporated into the audience characteristic extraction model 104 to enable precise segmentation.

In some examples, the user input includes temporal constraints to narrow the scope of targeting. These constraints may refer to specific time windows during which the described behavior must have occurred. For instance, the user may request to target "shoppers who bought electronics during the holiday season," or "grocery purchasers in the past 30 days." The system encodes these constraints as time filters that restrict SQL execution to relevant transaction or behavioral records. This allows the audience scoring model 118 to evaluate and rank users based on recent, time-sensitive data that aligns with marketing campaign objectives.

In some examples, the machine learning model 106 is configured to dynamically generate or instantiate a secondary machine learning model that is specialized for the particular audience described in a user's request. This dynamic model generation process enables the system to tailor its scoring, segmentation, or predictive logic specifically to the traits, behaviors, and targeting constraints specified for a given campaign or use case.

In one implementation, upon receiving an audience request—such as "New Yorkers who purchase coffee with their bagels"—the machine learning model 106 uses a combination of prompt interpretation, structured audience characteristic generation (via audience characteristic extraction model 104), and a library of model templates to create a new audience-specific model instance. This audience-specific model may include custom feature weighting, tailored input schemas, or retrained prediction layers that more precisely identify users fitting the defined behavioral and demographic profile. For instance, the system may generate a lightweight model that places greater emphasis on joint purchase behavior (e.g., coffee and bagels within the same transaction), location-based commuting patterns, or merchant visit frequency within the New York metropolitan area.

In some examples, the system bootstraps the specialized model by using transfer learning from a pre-trained base model. It extracts relevant subpopulations from the user database (e.g., New York mobile users with deli loyalty activity) and performs fine-tuning on historical interaction data to adjust the model weights for the new task. The result is a model that not only recognizes high-level traits from the original request but also adapts its scoring logic to emphasize behaviors most predictive of inclusion in the requested audience segment.

In other implementations, the machine learning model 106 outputs a serialized or compiled version of the specialized model (e.g., in ONNX or TensorFlow format), which is executed in parallel with broader scoring models. This allows real-time deployment of audience-specific classifiers into a live media buying or targeting pipeline without manual intervention. By using dynamic model generation, the system supports high-precision audience segmentation across a wide range of use cases, while also enabling optimization at the granularity of individual campaigns, geographic markets, or time windows.

In some examples, the second machine learning model is used to perform one or more of the processes described herein. For example, the second machine learning model generates the structured audience characteristics in block 204, as described below.

In addition to or instead of receiving a direct user input in natural language, the target audience SQL generation system 102 may automatically generate the audience request using available enterprise or contextual data sources. In some examples, this auto-generation process is performed by the machine learning model 106, which may include logic or algorithms capable of assembling a preliminary or recommended audience definition based on surrounding business data.

In some examples, the target audience SQL generation system 102 accesses company-specific data to formulate the initial request. For instance, the system may retrieve metadata associated with the advertiser's account, such as the company's operating region, industry vertical, or product catalog. If the advertiser is a national retailer launching a new product in the snack food category, the system may infer a starting audience focused on snack purchasers in priority markets.

In some examples, the system uses information about future product launches, marketing priorities, or sales targets to drive audience definition. If the advertiser has flagged an upcoming campaign to support a new eco-friendly detergent line, the system may automatically initiate a request describing environmentally conscious consumers, frequent laundry detergent buyers, or green product advocates.

In some examples, the system distinguishes between audience generation for a new product versus an existing product. For a new product, the system may apply broader lookalike modeling or use reference cohorts from adjacent categories. For an existing product, the system may draw from historical campaign performance data—such as which demographics or regions historically yielded the highest return on ad spend (ROAS)—to inform the audience request.

In some examples, the system compares past audiences and outcomes to known personas or audience cohorts, such as "value-conscious moms," "urban commuters," or "early tech adopters." These predefined cohorts can be used as semantic templates or targeting baselines, enabling the system to structure a synthetic audience request even before the user interacts with the interface.

By initiating this automatic audience input generation, the target audience SQL generation system 102 improves usability and accelerates workflow for media planners or marketers who may not always know how to articulate their targeting needs. It also enables proactive intelligence: the system suggests or even pre-selects high-potential audiences based on strategic business context, prior success, or emerging campaign goals.

In some examples, the target audience SQL generation system 102 uses the audience request—whether user-submitted or auto-generated from enterprise data—as a seed to generate a second machine learning model that is specifically tailored to identify, evaluate, or score members of the desired audience segment. This second model is produced or customized by the machine learning model 106, and is fine-tuned using context-relevant inputs that go beyond just the text of the request.

To construct this specialized model, the machine learning model 106 accesses additional data inputs that help to define the structure, scope, and optimization goals for the generated model, such as company metadata (e.g., industry vertical, region, size): can be used to select relevant training datasets or narrow the population scope of the generated model. A regional CPG brand in the Southeast might generate a model with geospatial weighting applied to that region, while a B2B software advertiser would generate a model with different feature priorities (e.g., business size, job title), product-level information where the system considers whether the target campaign involves a new product launch or an existing SKU, and/or the like. For a new product, the generated model might emphasize predictive lookalike behavior, using training data from adjacent categories. For an existing product, the system may initialize the model with historical purchase and exposure data, optimizing for repeat buyers or loyal segments.

The target audience SQL generation system 102 can access historical campaign performance where the system may access a performance log of prior campaign outcomes, including which types of audience segments resulted in higher click-through rates, conversions, or retention. These historical insights are used to prioritize or suppress certain features in the second model, such as demoting low-performing merchant categories or emphasizing high-ROI consumer behaviors. The target audience SQL generation system 102 can access known audience archetypes where the system may map the audience request or enterprise data to predefined personas or archetypes stored in a cohort library (e.g., "eco-conscious urban parents," "budget-focused seniors," "frequent airport diners"). These persona mappings provide structural templates-such as feature importance weights or behavioral patterns-which are used to initialize or condition the generated machine learning model.

Once these inputs are gathered and interpreted, the machine learning model 106 triggers a model generation pipeline, which may include selecting and preprocessing relevant user-level training data, assigning weights to features (e.g., demographics, purchase recency, loyalty status), applying transfer learning from existing audience models, compiling a scoring algorithm or classification model (e.g., gradient boosting, logistic regression, neural networks), and/or the like.

The resulting second model is optimized to score or select user IDs within the advertiser's reachability graph (e.g., based on device IDs, emails, or cookies) based on their likelihood of belonging to the specified audience. In some examples, this generated model replaces the need to rely solely on manually written SQL queries by encoding behavioral logic that is far more expressive and predictive than a rules-based filter.

In some examples, the target audience SQL generation system 102 uses the LLM to process a user input—such as in a natural language prompt describing a desired audience—and extract structured audience characteristics that define specific traits, behaviors, or attributes shared by individuals within that audience. These structured characteristics form the foundation for building queries, scoring models, or downstream ad targeting strategies.

In some examples, the structured audience characteristics generated by the LLM include demographic traits, such as age range, gender, income bracket, education level, or household size, geographic indicators, such as country, state, zip code, or urban vs. rural classification, behavioral traits, such as past purchase history, average cart size, store preferences, or frequency of product category engagement (e.g., "weekly organic snack buyers"), psychographic or intent-based signals, such as eco-consciousness, tech-savviness, or being in the market for a new car, temporal constraints, such as engagement during specific time windows (e.g., "last 30 days," "back-to-school season," or "holiday buyers"), and/or the like. These characteristics are derived from explicit customer behaviors (e.g., transactions, app logins) or inferred through indirect signals (e.g., media consumption patterns, product research activity).

In some examples, "structured" refers to a formalized and machine-readable representation of each audience characteristic, such that it can be parsed, indexed, and operationalized in automated systems. This typically involves expressing each trait in a field-operator-value format or as part of a weighted scoring model. For example:

Field-Operator-Value Format:

age >=30
region=="New York"
product_category in ["coffee", "bagels"]
purchase_frequency >=2 per week
loyalty_program_enrolled==true This structure enables downstream systems (e.g., database engines or scoring models) to directly use these characteristics in SQL queries or algorithmic filtering.

In some examples, the structured audience characteristics are also used to generate a weighted scoring model. This model assigns importance levels to each trait, allowing the system to rank or score users based on how closely they match the ideal audience profile.

For instance:

trait: "frequent coffee purchaser"→weight: 0.8
trait: "NYC-based"→weight: 1.0
trait: "commutes via public transit"→weight: 0.6

In this approach, a total audience relevance score is calculated per user by summing or averaging the weighted presence of these traits. The system can then set a threshold (e.g., score ≥0.75) for including users in the final audience segment.

At block 204, the target audience SQL generation system 102 processes, by the LLM, the audience request to generate one or more structured audience characteristics that define identifiable traits, behaviors, or criteria associated with the desired audience. These characteristics represent interpretable, machine-readable definitions of the audience described in the natural language input. This step transforms a general, high-level request (e.g., "people in New York who buy coffee with bagels") into specific, structured descriptors such as geographic region, behavioral traits, shopping preferences, and temporal patterns.

In some examples, the LLM applies natural language understanding (NLU) techniques to interpret and disambiguate user language. For instance, the term "New Yorkers" may be resolved to a structured geographic trait such as {"region": "New York"}, and the phrase "buy coffee with bagels" may be parsed into a product co-purchase behavior trait like {"product_combination": ["coffee", "bagel"]}. The LLM infers additional structured traits either explicitly from the text or through pretrained knowledge, statistical correlations, and user behavior priors.

In some examples, the LLM outputs these traits in a structured format, such as JSON, XML, or a key-value schema, where each trait includes a name, operator, and value (e.g., {"attribute": "age", "operator": ">", "value": 25}).

In some examples, the LLM supplements the user's audience request with additional attributes inferred from prior user interactions, campaign goals, or embedded business logic. For example, if the request lacks a time constraint, the LLM may apply a default recency window (e.g., "last 90 days") to ensure relevance. Or, if the user has previously asked for similar segments, the LLM may borrow traits from earlier sessions for continuity.

In some examples, the LLM uses its pretrained model weights to infer semantic connections between loosely defined terms and structured schema fields. For instance, the word "affluent" could translate into an income threshold (e.g., {"income": ">150K"}), while "tech-savvy" might correspond to behavioral features like {"device_type": "iPhone", "uses_mobile_app": true}.

Figure 3:
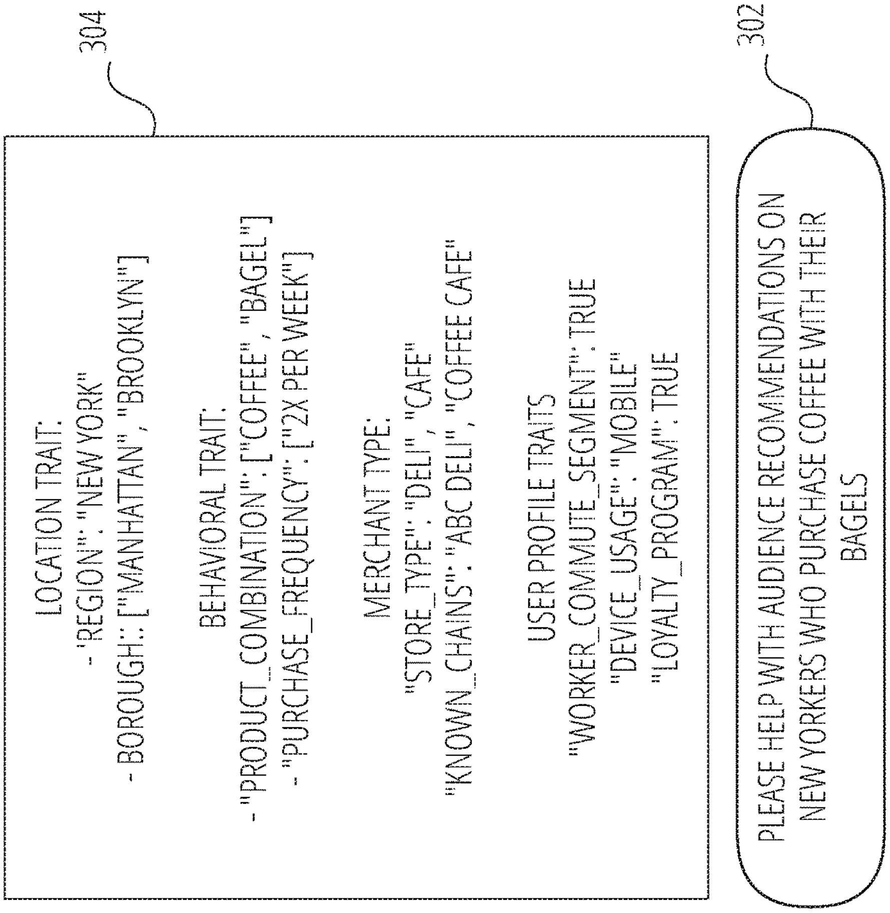
FIG. 3 illustrates an example chat-based user interface that supports natural language audience targeting using the target audience SQL generation system 102, according to some examples.

FIG. 3 illustrates an example chat-based user interface that supports natural language audience targeting using the target audience SQL generation system 102, according to some examples. The chat interface facilitates intuitive communication between a user and a LLM, allowing the user to describe audience goals in free-form text and receive a structured breakdown of audience characteristics that can be used for subsequent query generation and audience scoring.

In some examples, chat interface includes a user input panel 302, where the user provides a request in natural language. In this example, the user submits the request: "Please help with audience recommendations on New Yorkers who purchase coffee with their bagels." The user input panel 302 may support typed input, voice-to-text conversion, or data received via an API or graphical user interface (GUI). The request includes general behavioral, regional, and purchase-related intent related to a desired target audience.

In response to the request, the LLM embedded within the target audience SQL generation system 102 generates a structured prompt response 304, which is rendered in the chat interface. This response reflects the structured audience characteristics derived from the natural language request and is grouped by category to facilitate interpretability and downstream modeling.

In some examples, the structured response 304 includes:

Location Traits:
"region": "New York"
"borough": ["Manhattan", "Brooklyn"]
Behavioral Traits:
"product_combination": ["coffee", "bagel"]
"purchase_frequency": ["2× per week"]
Merchant Type:
"store_type": ["deli", "cafe"]
"known_chains": ["ABC Deli", "Coffee Cafe"]
User Profile Traits:
"worker_commute_segment": true
"device_usage": "mobile"
"loyalty_program": true In some examples, the structured audience characteristics generated in prompt response 304 are passed to downstream modules (e.g., audience scoring model 118 or audience campaign deployment model 120) to generate SQL queries or scoring algorithms, and ultimately to identify matching users from a user database.

In some implementations, the user may iteratively refine the audience definition through additional chat inputs. For example, the user may further specify a timeframe (e.g., "only on weekday mornings") or request audience size estimates, and the LLM will update or expand the structured characteristics accordingly.

This chat interface, as illustrated in FIG. 3, exemplifies the generative audience design philosophy underlying the system—where unstructured audience intent is transformed into structured, actionable targeting logic without requiring manual engineering or rule-based segmentation.

At block 206, the target audience SQL generation system 102 receives, from the user, a request to generate a SQL query based on the one or more structured audience characteristics. The user request in block 206 acts as a trigger instructing the target audience SQL generation system 102 to transition from defining the audience (e.g., "New Yorkers who buy coffee and bagels") to operationalizing that definition by converting it into executable query code.

In some examples, the request received by the target audience SQL generation system 102 may take one of several forms, depending on the user interface. For example, the request is natural language input where the user types, "Generate SQL for this audience", or "Create a targeting query now," a GUI command in a graphical interface, where the user clicks a "Generate SQL" button after reviewing the structured audience characteristics, an API call where if the system is integrated into a larger ad tech stack, a third-party ad platform or campaign manager may send a structured API request to initiate query generation, a chained dialogue where the user may simply continue interacting through a chatbot-style interface, and the LLM infers that a query is being requested based on the context of the conversation, and/or the like. In any of these cases, the target audience SQL generation system 102 recognizes that the next step is to translate the structured audience characteristics into a format that can be executed against a backend database.

In some examples, the system handles the generation of SQL queries for different downstream purposes, including creating real-time audience segments for programmatic media buys, recommending cohorts to upload into demand-side platforms (DSPs), simulating audience reach before campaign execution, sending the query to a preview engine for validation/testing, and/or the like.

The request may include query constraints, such as maximum number of users to return, geographic database restrictions, privacy compliance flags (e.g., to avoid generating queries with personally identifiable information), filters by date, region, or product categories, and/or the like.

At block 208, the target audience SQL generation system 102 processes, by the LLM, the request to generate an SQL query based on the one or more structured audience characteristics. The target audience SQL generation system 102 processes, by the LLM, the request received to translate the structured audience characteristics-which represent identifiable traits, behaviors, or conditions of a target audience-into syntactically valid and executable SQL code that can be run against a user database.

In some examples, the structured audience characteristics generated at block 204 serve as the primary input to this block. These characteristics are defined as structured fields (e.g., age_range: 25-34, purchase_history: coffee, region: New York) with optional metadata, such as weighting, temporal constraints, or logical operators. Each characteristic provides a targeting constraint or filter condition that should be incorporated into the WHERE clause (or equivalent logic) of the SQL query.

In some examples, the LLM dynamically generates SQL code based on these characteristics. The LLM performs the following: interprets each structured field (e.g., income_level="high", merchant_type="cafe") and determines the corresponding field name and value in the database schema, generates SQL syntax to reflect filtering conditions, logical relationships (e.g., AND/OR), grouping, or temporal qualifiers, assembles the SQL query with proper SELECT, FROM, WHERE, and JOIN clauses to target the relevant user dataset, ensures compliance with query constraints such as result limits, privacy filters, or database-specific dialects (e.g., PostgreSQL, BigQuery), and/or the like.

In some examples, the SQL query generated by the LLM may include simple filters:

```
SELECT user_id FROM user_data
WHERE region='New York' AND product_combination @>ARRAY ['coffee', 'bagel'];
```

Temporal filters:

```
AND purchase_date>CURRENT_DATE-INTERVAL '30 days'
```

Behavioral scoring logic (when combined with weighted models):

```
SELECT user_id, score
FROM (
  SELECT user_id,
    (CASE WHEN loyalty_program=TRUE THEN 1 ELSE 0 END)+
    (CASE WHEN device_usage='mobile' THEN 1 ELSE 0 END) AS score
  FROM user_data)
  AS scored_users
WHERE score >=2;
```

In some examples, the target audience SQL generation system 102 generates different types of output depending on system configuration or downstream integration:

A fully executable SQL string returned as output.

A parameterized SQL template for later population.

A query plan that explains how the query would execute for debugging or approval.

In some examples, the same LLM that processes the user input also generates the SQL query. This enables streamlined inference and state continuity, since the LLM has already parsed the context and structured traits of the desired audience.

In some examples, the system uses a separate, specialized LLM to generate the SQL query based on the structured audience characteristics. This approach enables dedicated fine-tuning for query generation, optimization, schema awareness, and query safety, while decoupling natural language processing from database translation logic.

In some examples, the target audience SQL generation system 102 executes the SQL query that was generated based on structured audience characteristics. In some examples, the user database includes various forms of user identifiers, such as:

User ID: A unique internal identifier assigned to each user.

IP address: Useful for identifying geographic region or network location.

Name or hashed name: Depending on privacy constraints, this may be used to cross-reference demographic records.

Device ID, email hash, or cookie ID: Used to support identity resolution across sessions and devices.

These identifiers allow the system to precisely target or group users for advertising or downstream personalization activities.

In some examples, instead of returning only a binary set of matching users, the target audience SQL generation system 102 can generate tiered audience segments based on the degree of match to the structured audience characteristics. For instance:

Core Match Segment: Users who fully satisfy all conditions of the SQL query.

Fringe Match Segment: Users who satisfy a portion of the conditions and are, for example, within 20% likelihood of matching fully. These may represent users who:

Live near but not within the specified geography.

Purchase one of the two target products (e.g., coffee but not bagels).

Match based on inferred behaviors (e.g., commuting time, product affinity).

The system can associate these fringe users with a confidence score or conversion likelihood score to reflect how closely their behavior aligns with the ideal target audience. These scores may be computed using a classifier or probabilistic model trained on past campaign outcomes. This tiered segmentation approach enables more nuanced audience targeting, allowing advertisers to apply differential bidding, messaging, or testing strategies across segments.

At block 210, the target audience SQL generation system 102 executes the SQL query against a database comprising user identifiers to identify a subset of users corresponding to the desired target audience.

Figure 4:
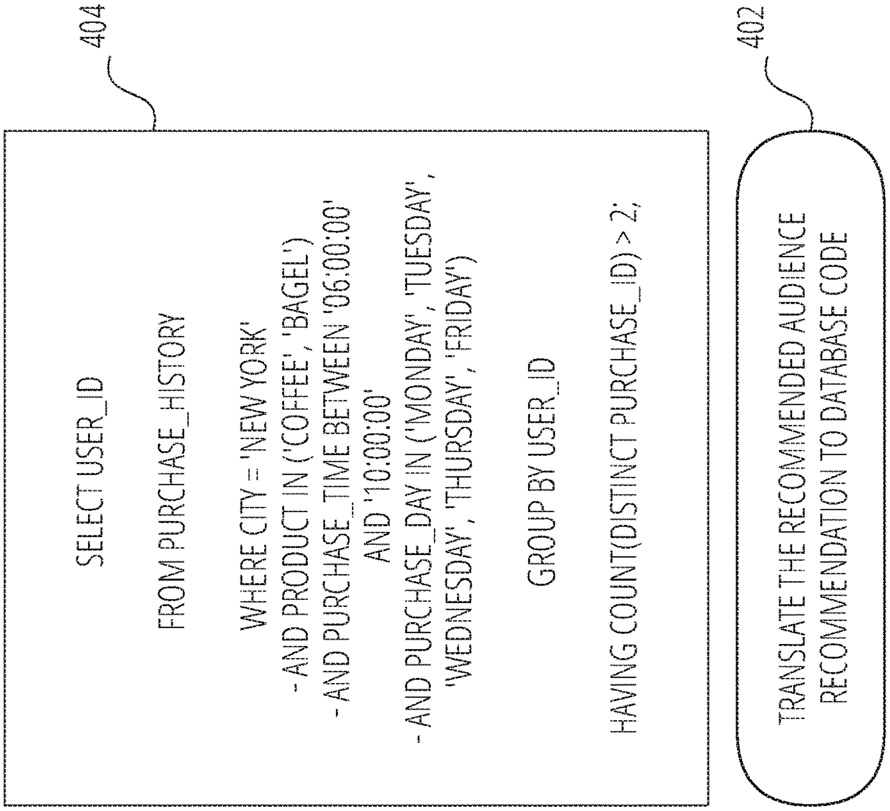
FIG. 4 illustrates an example of a chat-based query-to-code translation interface in the target audience SQL generation system 102, according to some examples.

FIG. 4 illustrates an example of a chat-based query-to-code translation interface in the target audience SQL generation system 102, according to some examples. This figure highlights how a user can request the system to convert a high-level, human-readable audience intent into an executable SQL statement for identifying matching user records in a database.

A user input 402 is provided through a chat or form interface. In this example, the user types the following instruction: "Translate the recommended audience recommendation to database code"

In some examples, this user input is provided in natural language, and it instructs the LLM to convert a previously discussed or inferred audience profile into SQL. The audience profile could have been generated earlier in a session (e.g., as structured audience characteristics) or retrieved from historical recommendations.

This command activates the SQL query generation functionality (such as described in block 208), where the system maps structured traits to a concrete query that targets specific records in a user database.

The LLM outputs an SQL query 404 in response to the instruction from user input 402. Each clause of the query reflects a part of the desired audience segmentation logic, and together they define a precise, machine-executable representation of the targeting criteria:

SELECT user_id

Instructs the system to return unique user identifiers that meet the following filtering conditions.

FROM purchase_history

Specifies the source table. This table includes records of past user purchases, assumed to contain columns such as product, purchase_time, purchase_day, etc.

WHERE city='New York'

Restricts results to users who made purchases within the New York region-fulfilling a geographic constraint.

AND product IN ('coffee', 'bagel')

Filters purchase events to include only those where the user bought coffee, a bagel, or both-modeling a product affinity condition.

AND purchase_time BETWEEN '06:00:00' AND '10:00:00'

Narrows the purchase time to early morning hours-commonly associated with breakfast. This adds a temporal context to the behavior.

AND purchase_day IN ('Monday', 'Tuesday', 'Wednesday', 'Thursday', 'Friday')

Targets purchases made on weekdays—suggesting that the system is trying to find routine, workday behaviors (e.g., morning coffee runs).

GROUP BY user_id

Groups results by user ID so that the system can perform aggregations (e.g., count how many qualifying purchases a user has made).

HAVING COUNT (DISTINCT purchase_id)>2

Ensures that only users who have made more than two distinct qualifying purchases are included in the final result-enforcing a frequency threshold for meaningful behavior.

System Architecture for Audience-Driven Ad Campaign Deployment

Figure 5:
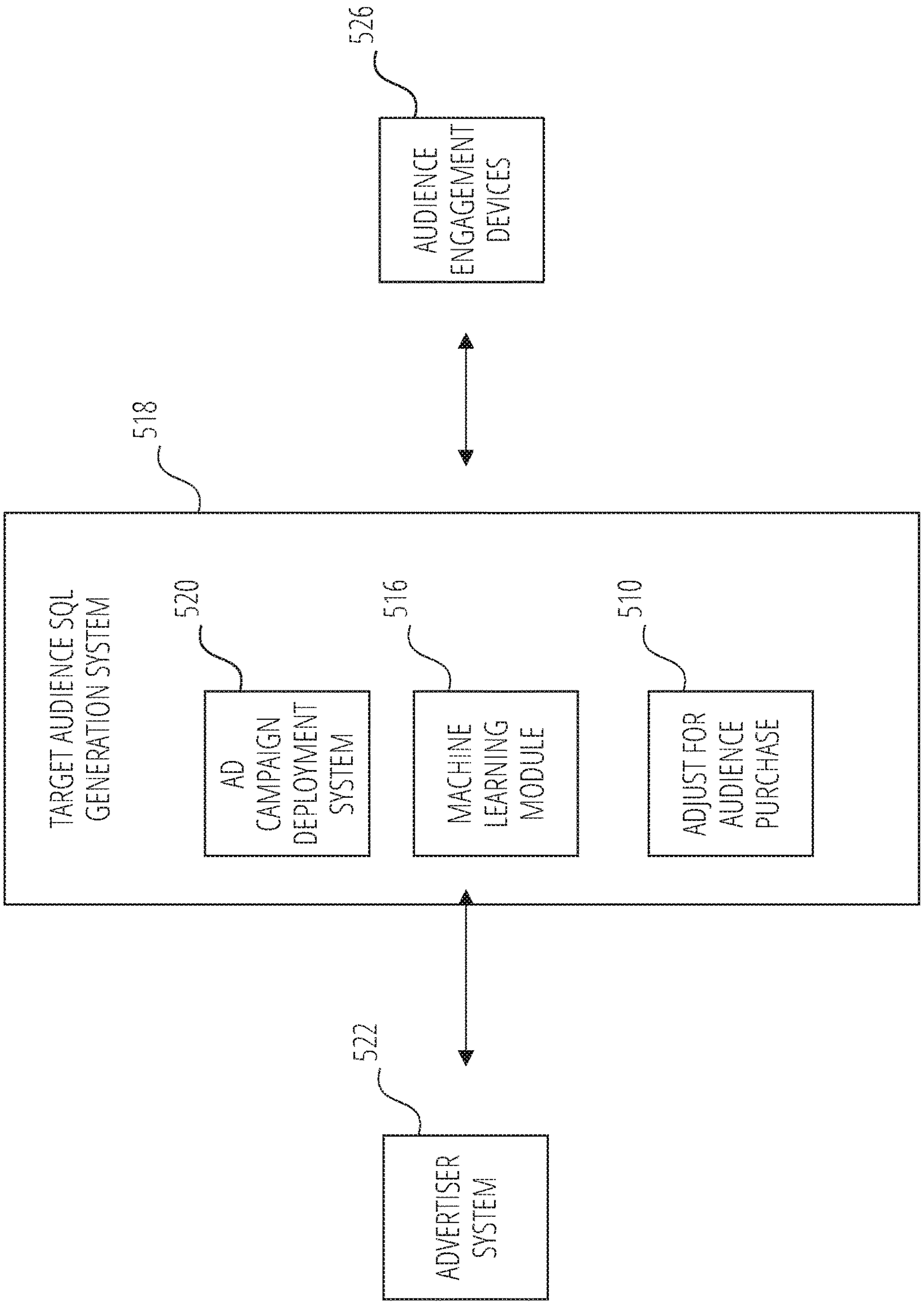
FIG. 5 illustrates an example system architecture for generating and deploying targeted advertising campaigns based on audience segments produced by a generative artificial intelligence (AI) system, according to some examples.

FIG. 5 illustrates an example system architecture for generating and deploying targeted advertising campaigns based on audience segments produced by a generative artificial intelligence (AI) system, according to some examples. The system includes six main components that work together to process advertiser requests, generate structured audience definitions, identify eligible users, deploy ads, and evaluate campaign performance for continuous optimization.

In some examples, the target audience SQL generation system 518 serves as the central audience processing and orchestration engine. The system receives natural language input from advertisers—such as "Target New Yorkers who purchase coffee with their bagels"—and coordinates the necessary sub-processes to produce structured audience segments. These outputs include SQL queries that define targeting logic used to identify relevant users.

The target audience SQL generation system 518 performs key responsibilities such as parsing advertiser requests, calling the machine learning module 516 to extract structured characteristics, and generating query logic to identify matching user records in backend databases. The results are sent downstream to inform ad campaign construction and delivery.

In some examples, the machine learning module 516 includes the internal AI components responsible for interpreting the advertiser's audience request and converting it into actionable characteristics and scoring logic. The module includes an audience characteristic extraction model, which interprets input from the advertiser (e.g., demographic traits, behavioral signals, geographic constraints) and generates structured fields (e.g., {city: "New York", product_combination: ["coffee", "bagel"]}), and/or an audience scoring model, which ranks or tiers users in the population based on how closely they match the desired traits. For example, users might be scored as high affinity (exact matches) or moderate affinity (partial matches). The output of the machine learning module 516 is used to generate SQL or other targeting logic to query databases of user behavior and select users for campaign delivery.

In some examples, the advertiser system 522 represents the interface used by brand marketers, agencies, or demand-side platforms (DSPs) to define new campaign objectives. This system allows users to submit natural language inputs requesting a target audience and may include an interactive chatbot, graphical interface, or API integration.

The advertiser system 522 sends these audience definitions to the target audience SQL generation system 518 for processing. The advertiser may specify goals such as product interest, behavioral intent, preferred merchants, or geography. In some examples, the advertiser system 522 may also review prior campaign performance, select creative assets, or impose delivery constraints (e.g., timing, budget, or targeting precision).

In some examples, the ad campaign deployment system 520 receives structured user segments (e.g., user IDs, device IDs, hashed emails) produced by the target audience SQL generation system 518 and uses these segments to construct and deliver a digital advertising campaign. The campaign may be delivered across various media channels, including connected TV (CTV), mobile apps, web display, or retail media networks.

The ad campaign deployment system 520 executes campaign parameters such as ad creative selection, frequency caps, geo-targeting, and budget pacing. It interfaces with real-time bidding platforms, ad servers, and delivery systems to serve ads to the appropriate users at scale.

In some examples, the audience engagement devices 526 represent the hardware endpoints used by target users. These may include smartphones, tablets, smart TVs, laptops, or other internet-connected devices. These devices receive the personalized or targeted ad impressions triggered by the ad campaign deployment system 520.

The audience engagement devices 526 are critical in completing the delivery loop, as they serve as the channels through which users are exposed to the advertising content. In some examples, user interactions (e.g., clicks, views, purchases) on these devices are recorded for downstream performance analysis.

In some examples, the campaign logger and feedback system 510 records campaign outcomes, including ad delivery metrics, user interaction events, conversion data, and performance KPIs. This data is sent back to the target audience SQL generation system 518 or the machine learning module 516 to update scoring models and refine future audience recommendations.

For example, if a particular campaign shows high conversion rates for users aged 25-34 in urban markets, the system may update the audience scoring model in the machine learning module 516 to prioritize similar traits for future campaigns. This feedback loop supports continuous learning and real-time optimization of targeting strategies.

Machine Architecture

Figure 6:
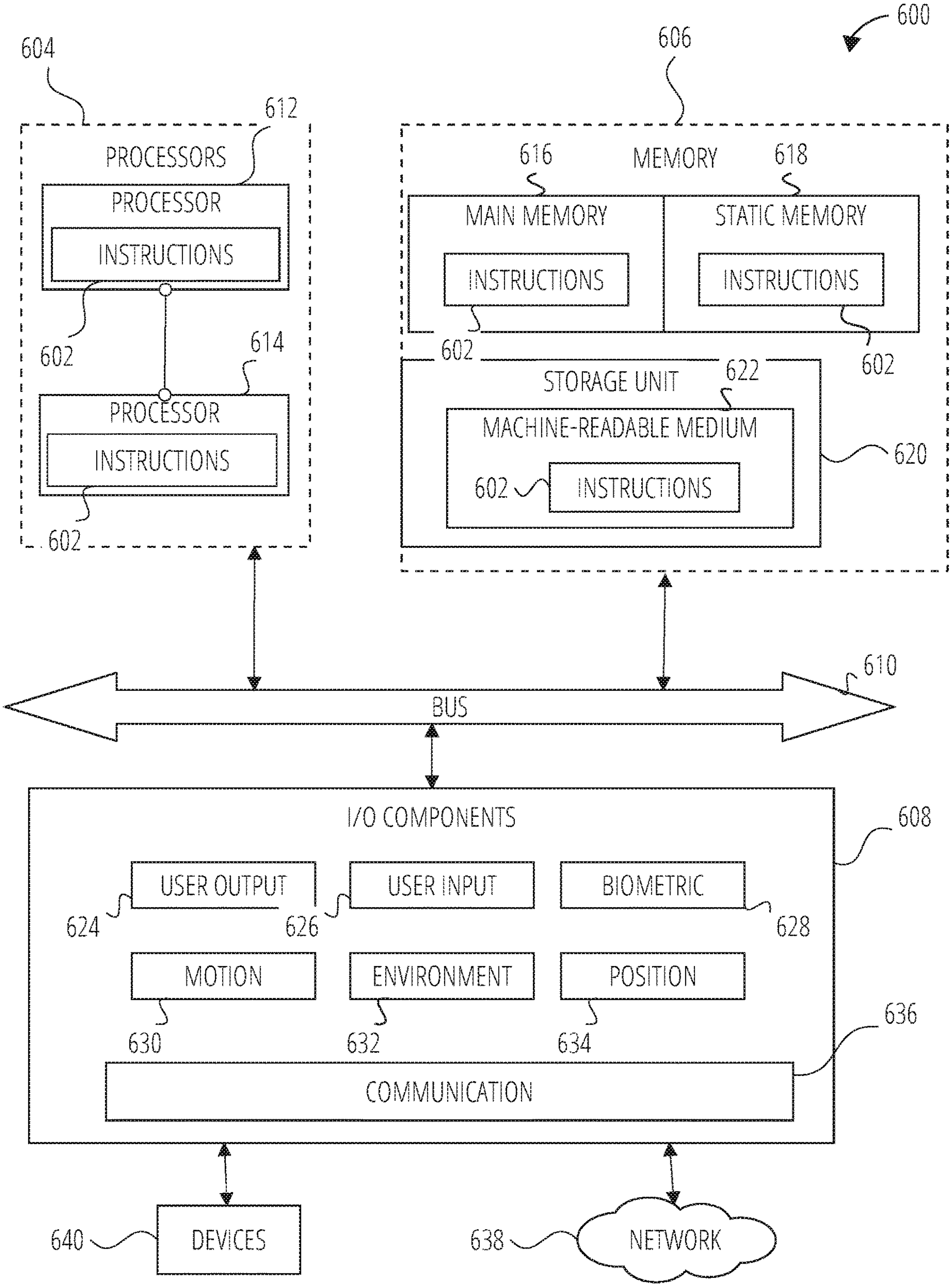
FIG. 6 is a diagrammatic representation of a machine in the form of a computer system within which a set of instructions may be executed to cause the machine to perform any one or more of the methodologies discussed herein, according to some examples.

FIG. 6 is a diagrammatic representation of the machine 600 within which instructions 602 (e.g., software, a program, an application, an applet, an app, or other executable code) for causing the machine 600 to perform any one or more of the methodologies discussed herein may be executed. For example, the instructions 602 may cause the machine 600 to execute any one or more of the methods described herein. The instructions 602 transform the general, non-programmed machine 600 into a particular machine 600 programmed to carry out the described and illustrated functions in the manner described. The machine 600 may operate as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 602, sequentially or otherwise, that specify actions to be taken by the machine 600. Further, while a single machine 600 is illustrated, the term "machine" shall also be taken to include a collection of machines that individually or jointly execute the instructions 602 to perform any one or more of the methodologies discussed herein. The machine 600, for example, may comprise a user system or any one of multiple server devices forming part of the server system. In some examples, the machine 600 also comprises both client and server systems, with certain operations of a particular method or algorithm being performed on the server-side and with certain operations of the particular method or algorithm being performed on the client-side.

The machine 600 may include processors 604, memory 606, and input/output I/O components 608, which may be configured to communicate with each other via a bus 610. In an example, the processors 604 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 612 and a processor 614 that execute the instructions 602. The term "processor" is intended to include multi-core processors that may comprise two or more independent processors (sometimes referred to as "cores") that may execute instructions contemporaneously. Although FIG. 6 shows multiple processors 604, the machine 600 may include a single processor with a single-core, a single processor with multiple cores (e.g., a multi-core processor), multiple processors with a single core, multiple processors with multiples cores, or any combination thereof.

The memory 606 includes a main memory 616, a static memory 618, and a storage unit 620, both accessible to the processors 604 via the bus 610. The main memory 606, the static memory 618, and storage unit 620 store the instructions 602 embodying any one or more of the methodologies or functions described herein. The instructions 602 may also reside, completely or partially, within the main memory 616, within the static memory 618, within machine-readable medium 622 within the storage unit 620, within at least one of the processors 604 (e.g., within the processor's cache memory), or any suitable combination thereof, during execution thereof by the machine 600.

The I/O components 608 may include a wide variety of components to receive input, provide output, produce output, transmit information, exchange information, capture measurements, and so on. The specific I/O components 608 that are included in a particular machine will depend on the type of machine. For example, portable machines such as mobile phones may include a touch input device or other such input mechanisms, while a headless server machine will likely not include such a touch input device. It will be appreciated that the I/O components 608 may include many other components that are not shown in FIG. 6. In various examples, the I/O components 608 may include user output components 624 and user input components 626. The user output components 624 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 626 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 608 may include medical device components 628, motion components 630, environmental components 632, or position components 634, among a wide array of other components. For example, the medical device components 628 include components to detect data from medical devices, as further described herein.

The motion components 630 include acceleration sensor components (e.g., accelerometer), gravitation sensor components, rotation sensor components (e.g., gyroscope).

The environmental components 632 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gasses for safety or to measure pollutants in the atmosphere), or other components that may provide indications, measurements, or signals corresponding to a surrounding physical environment.

The position components 634 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 608 further include communication components 636 operable to couple the machine 600 to a network 638 or devices 640 via respective coupling or connections. For example, the communication components 636 may include a network interface component or another suitable device to interface with the network 638. In further examples, the communication components 636 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 640 may be another machine or any of a wide variety of peripheral devices (e.g., a peripheral device coupled via a USB).

Moreover, the communication components 636 may detect identifiers or include components operable to detect identifiers. For example, the communication components 636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 636, such as location via Internet Protocol (IP) geolocation, location via Wi-Fi® signal triangulation, location via detecting an NFC beacon signal that may indicate a particular location, and so forth.

The various memories (e.g., main memory 616, static memory 618, and memory of the processors 604) and storage unit 620 may store one or more sets of instructions and data structures (e.g., software) embodying or used by any one or more of the methodologies or functions described herein. These instructions (e.g., the instructions 602), when executed by processors 604, cause various operations to implement the disclosed examples.

The instructions 602 may be transmitted or received over the network 638, using a transmission medium, via a network interface device (e.g., a network interface component included in the communication components 636) and using any one of several well-known transfer protocols (e.g., hypertext transfer protocol (HTTP)). Similarly, the instructions 602 may be transmitted or received using a transmission medium via a coupling (e.g., a peer-to-peer coupling) to the devices 640.

Software Architecture

Figure 7:
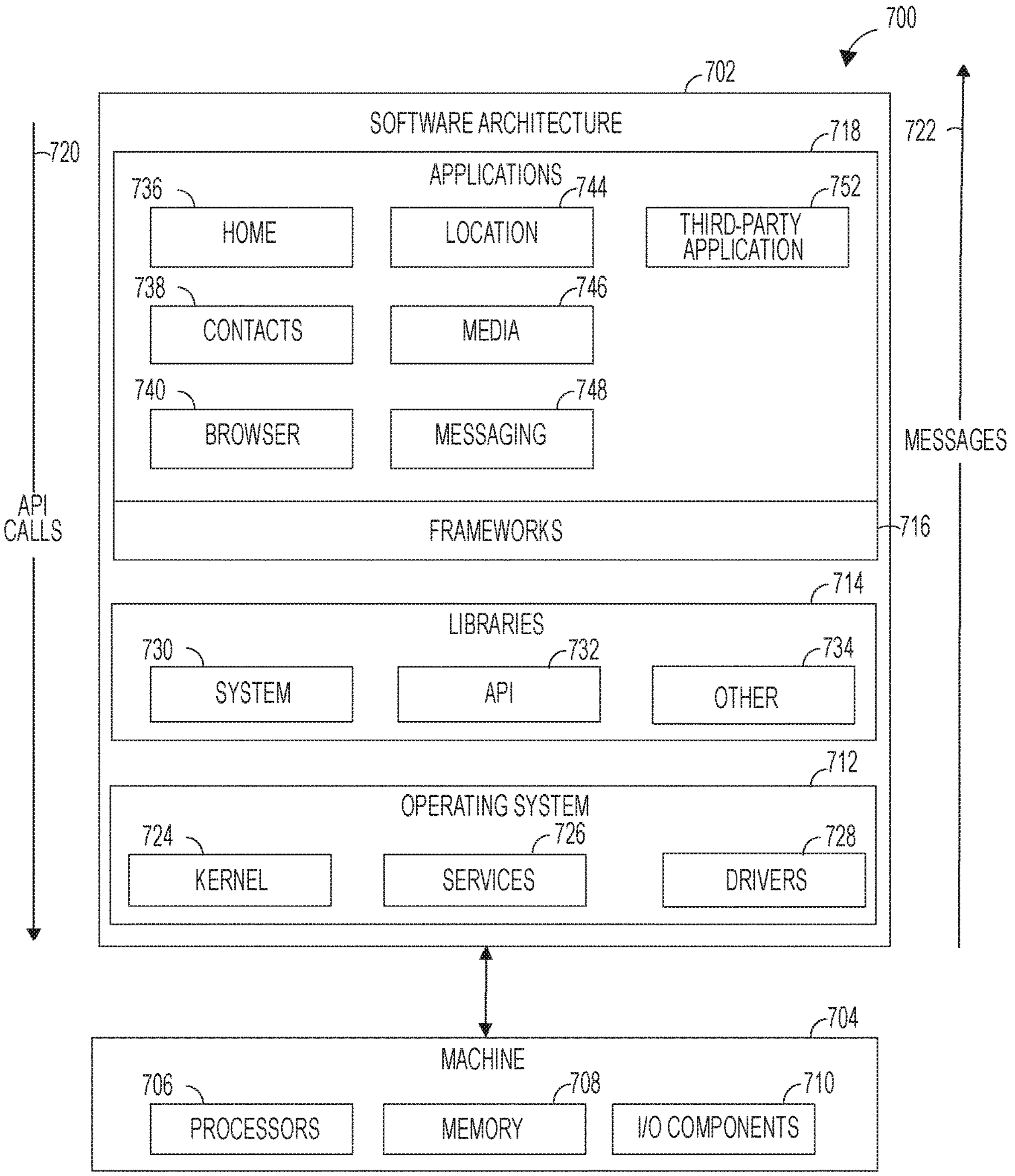
FIG. 7 is a block diagram showing a software architecture within which examples may be implemented.

FIG. 7 is a block diagram 700 illustrating a software architecture 702, which can be installed on any one or more of the devices described herein. The software architecture 702 is supported by hardware such as a machine 704 that includes processors 706, memory 708, and I/O components 710. In this example, the software architecture 702 can be conceptualized as a stack of layers, where each layer provides a particular functionality. The software architecture 702 includes layers such as an operating system 712, libraries 714, frameworks 716, and applications 718. Operationally, the applications 718 invoke API calls 720 through the software stack and receive messages 722 in response to the API calls 720.

The operating system 712 manages hardware resources and provides common services. The operating system 712 includes, for example, a kernel 724, services 726, and drivers 728. The kernel 724 acts as an abstraction layer between the hardware and the other software layers. For example, the kernel 724 provides memory management, processor management (e.g., scheduling), component management, networking, and security settings, among other functionalities. The services 726 can provide other common services for the other software layers. The drivers 728 are responsible for controlling or interfacing with the underlying hardware. For instance, the drivers 728 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 714 provide a common low-level infrastructure used by the applications 718. The libraries 714 can include system libraries 730 (e.g., C standard library) that provide functions such as memory allocation functions, string manipulation functions, mathematic functions, and the like. In addition, the libraries 714 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 714 can also include a wide variety of other libraries 734 to provide many other APIs to the applications 718.

The frameworks 716 provide a common high-level infrastructure that is used by the applications 718. For example, the frameworks 716 provide various graphical user interface (GUI) functions, high-level resource management, and high-level location services. The frameworks 716 can provide a broad spectrum of other APIs that can be used by the applications 718, some of which may be specific to a particular operating system or platform.

In an example, the applications 718 may include a home application 736, a contacts application 738, a browser application 740, a location application 744, a media application 746, a messaging application 748, and a broad assortment of other applications such as a third-party application 752. The applications 718 are programs that execute functions defined in the programs. Various programming languages can be employed to create one or more of the applications 718, structured in a variety of manners, such as object-oriented programming languages (e.g., Objective-C, Java, or C++) or procedural programming languages (e.g., C or assembly language). In a specific example, the third-party application 752 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 752 can invoke the API calls 720 provided by the operating system 712 to facilitate functionalities described herein.

Machine-Learning Pipeline

Figure 9:
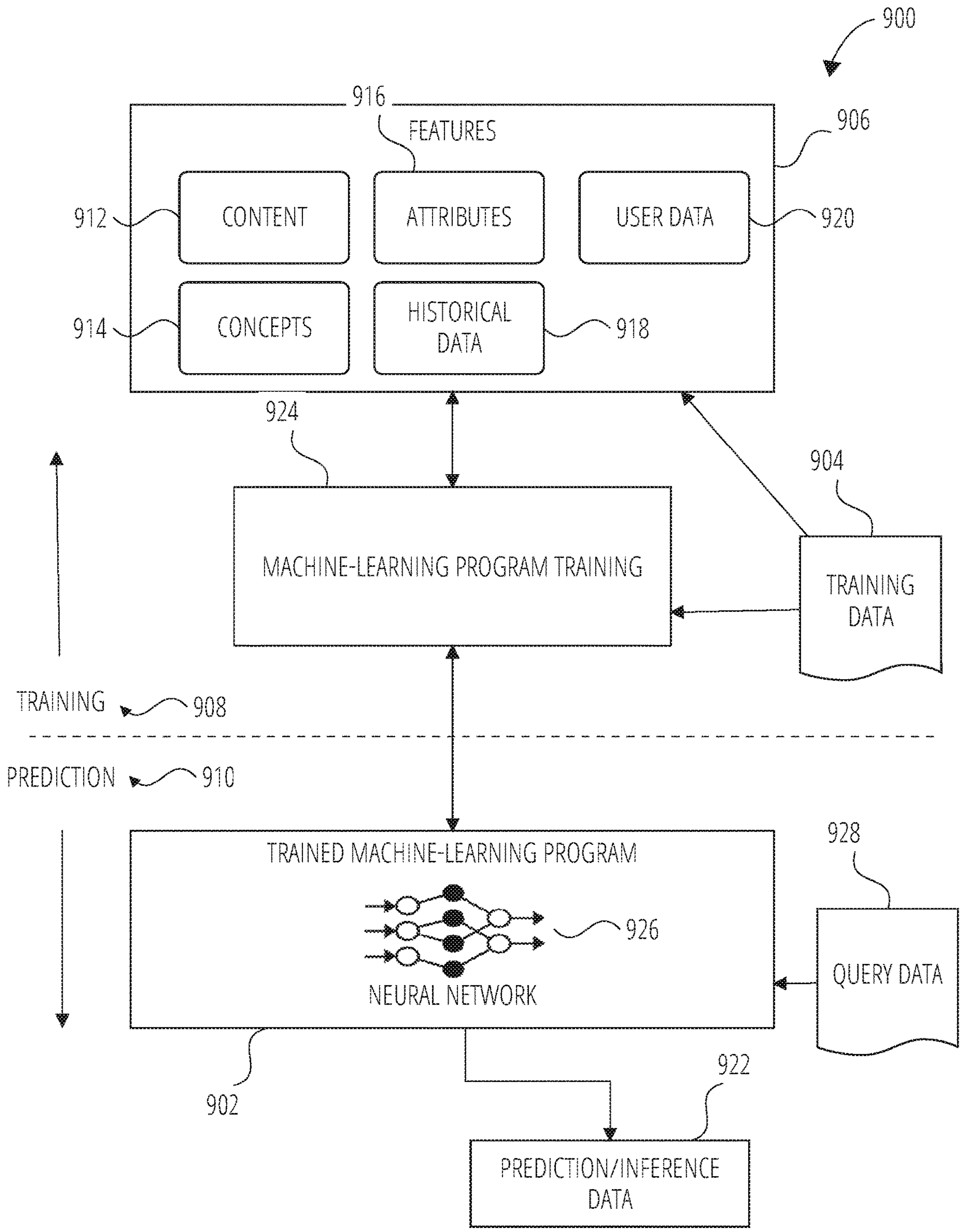
FIG. 9 illustrates training and use of a machine-learning program, according to some examples.

FIG. 9 is a flowchart depicting a machine-learning pipeline 900, according to some examples. The machine-learning pipelines 900 may be used to generate a trained model, for example the trained machine-learning program 902 of FIG. 9, described herein to perform operations associated with searches and query responses.

Broadly, machine learning may involve using computer algorithms to automatically learn patterns and relationships in data, potentially without the need for explicit programming to do so after the algorithm is trained. Examples of machine learning algorithms can be divided into three main categories: supervised learning, unsupervised learning, and reinforcement learning.

- Supervised learning involves training a model using labeled data to predict an output for new, unseen inputs. Examples of supervised learning algorithms include linear regression, decision trees, and neural networks.
- Unsupervised learning involves training a model on unlabeled data to find hidden patterns and relationships in the data. Examples of unsupervised learning algorithms include clustering, principal component analysis, and generative models like autoencoders.
- Reinforcement learning involves training a model to make decisions in a dynamic environment by receiving feedback in the form of rewards or penalties. Examples of reinforcement learning algorithms include Q-learning and policy gradient methods.

Examples of specific machine learning algorithms that may be deployed, according to some examples, include logistic regression, which is a type of supervised learning algorithm used for binary classification tasks. Logistic regression models the probability of a binary response variable based on one or more predictor variables. Another example type of machine learning algorithm is Naïve Bayes, which is another supervised learning algorithm used for classification tasks. Naïve Bayes is based on Bayes' theorem and assumes that the predictor variables are independent of each other. Random Forest is another type of supervised learning algorithm used for classification, regression, and other tasks. Random Forest builds a collection of decision trees and combines their outputs to make predictions. Further examples include neural networks which consist of interconnected layers of nodes (or neurons) that process information and make predictions based on the input data. Matrix factorization is another type of machine learning algorithm used for recommender systems and other tasks. Matrix factorization decomposes a matrix into two or more matrices to uncover hidden patterns or relationships in the data. Support Vector Machines (SVM) are a type of supervised learning algorithm used for classification, regression, and other tasks. SVM finds a hyperplane that separates the different classes in the data. Other types of machine learning algorithms include decision trees, k-nearest neighbors, clustering algorithms, and deep learning algorithms such as convolutional neural networks (CNN), recurrent neural networks (RNN), and transformer models. The choice of algorithm depends on the nature of the data, the complexity of the problem, and the performance requirements of the application.

The performance of machine learning models is typically evaluated on a separate test set of data that was not used during training to ensure that the model can generalize to new, unseen data. Evaluating the model on a separate test set helps to mitigate the risk of overfitting, a common issue in machine learning where a model learns to perform exceptionally well on the training data but fails to maintain that performance on data it hasn't encountered before. By using a test set, the system obtains a more reliable estimate of the model's real-world performance and its potential effectiveness when deployed in practical applications.

Although several specific examples of machine learning algorithms are discussed herein, the principles discussed herein can be applied to other machine learning algorithms as well. Deep learning algorithms such as convolutional neural networks, recurrent neural networks, and transformers, as well as more traditional machine learning algorithms like decision trees, random forests, and gradient boosting may be used in various machine learning applications.

Two example types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

Figure 8:
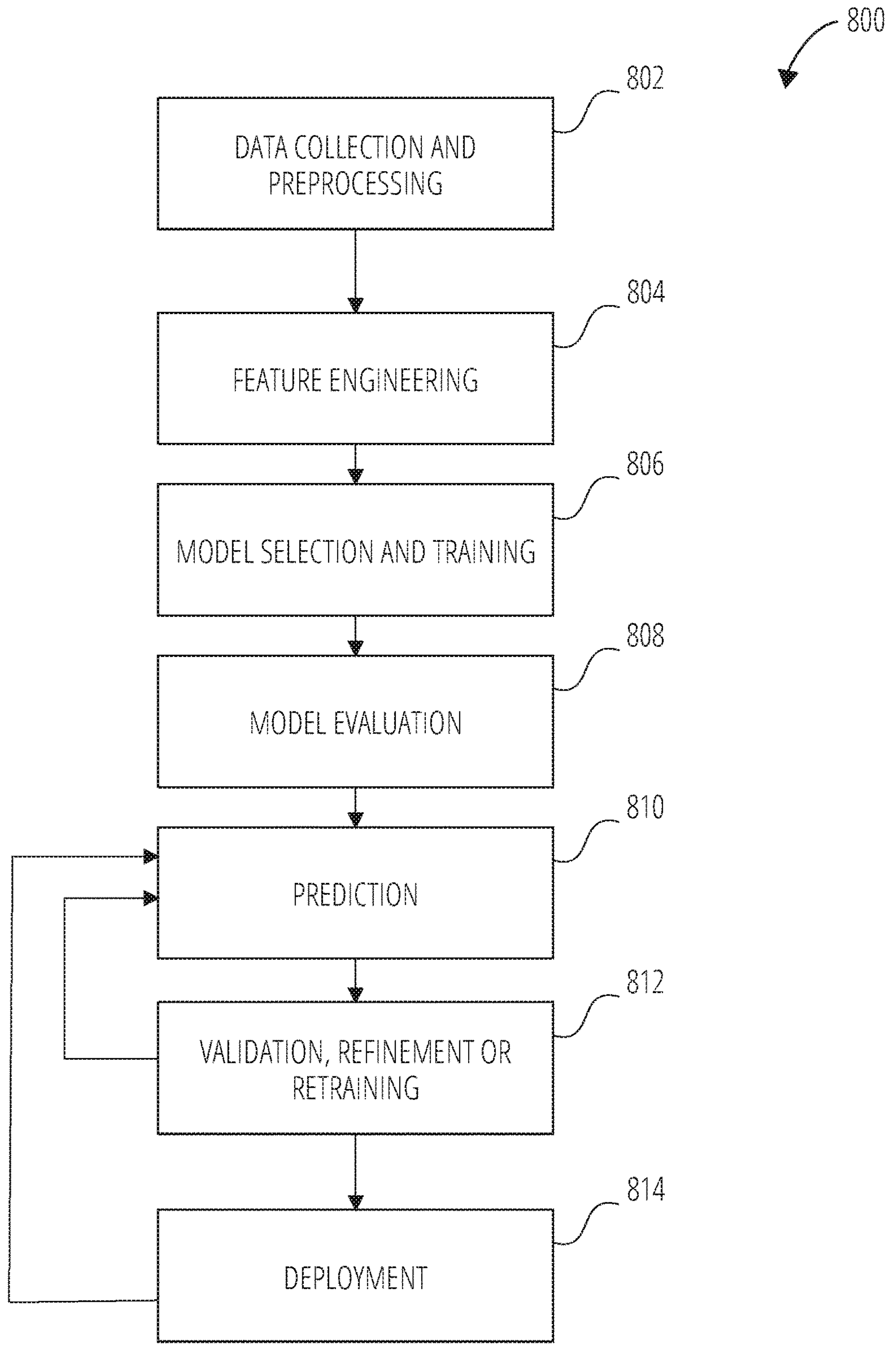
FIG. 8 illustrates a machine-learning pipeline, according to some examples.

Generating a trained machine-learning program 902 may include multiple types of phases that form part of the machine-learning pipeline 900, including for example the following phases 800 illustrated in FIG. 8:

- Data collection and preprocessing 802: This may include acquiring and cleaning data to ensure that it is suitable for use in the machine learning model. Data can be gathered from user content creation and labeled using a machine learning algorithm trained to label data. Data can be generated by applying a machine learning algorithm to identify or generate similar data. This may also include removing duplicates, handling missing values, and converting data into a suitable format.
- Feature engineering 804: This may include selecting and transforming the training data 904 to create features that are useful for predicting the target variable. Feature engineering may include (1) receiving features 906 (e.g., as structured or labeled data in supervised learning) and/or (2) identifying features 906 (e.g., unstructured or unlabeled data for unsupervised learning) in training data 904.
- Model selection and training 806: This may include specifying a particular problem or desired response from input data, selecting an appropriate machine learning algorithm, and training it on the preprocessed data. This may further involve splitting the data into training and testing sets, using cross-validation to evaluate the model, and tuning hyperparameters to improve performance. Model selection can be based on factors such as the type of data, problem complexity, computational resources, or desired performance.
- Model evaluation 808: This may include evaluating the performance of a trained model (e.g., the trained machine-learning program 902) on a separate testing dataset. This can help determine if the model is overfitting or underfitting and if it is suitable for deployment.
- Prediction 810: This involves using a trained model (e.g., trained machine-learning program 902) to generate predictions on new, unseen data.
- Validation, refinement or retraining 812: This may include updating a model based on feedback generated from the prediction phase, such as new data or user feedback.
- Deployment 814: This may include integrating the trained model (e.g., the trained machine-learning program 902) into a larger system or application, such as a web service, mobile app, or IoT device. This can involve setting up APIs, building a user interface, and ensuring that the model is scalable and can handle large volumes of data.

FIG. 9 illustrates two example phases, namely a training phase 908 (part of the model selection and trainings 906) and a prediction phase 910 (part of prediction 910). Prior to the training phase 908, feature engineering 904 is used to identify features 906. This may include identifying informative, discriminating, and independent features for the effective operation of the trained machine-learning program 902 in pattern recognition, classification, and regression. In some examples, the training data 904 includes labeled data, which is known data for pre-identified features 906 and one or more outcomes.

Each of the features 906 may be a variable or attribute, such as individual measurable property of a process, article, system, or phenomenon represented by a data set (e.g., the training data 904). Features 906 may also be of different types, such as numeric features, strings, vectors, matrices, encodings, and graphs, and may include one or more of content 912, concepts 914, attributes 916, historical data 918 and/or user data 920, merely for example. Concept features can include abstract relationships or patterns in data, such as determining a topic of a document or discussion in a chat window between users. Content features include determining a context based on input information, such as determining a context of a user based on user interactions or surrounding environmental factors. Context features can include text features, such as frequency or preference of words or phrases, image features, such as pixels, textures, or pattern recognition, audio classification, such as spectrograms, and/or the like. Attribute features include intrinsic attributes (directly observable) or extrinsic features (derived), such as identifying square footage, location, or age of a real estate property identified in a camera feed. User data features include data pertaining to a particular individual or to a group of individuals, such as in a geographical location or that share demographic characteristics. User data can include demographic data (such as age, gender, location, or occupation), user behavior (such as browsing history, purchase history, conversion rates, click-through rates, or engagement metrics), or user preferences (such as preferences to certain video, text, or digital content items). Historical data includes past events or trends that can help identify patterns or relationships over time.

In training phases 908, the machine-learning pipeline 900 uses the training data 904 to find correlations among the features 906 that affect a predicted outcome or prediction/inference data 922.

With the training data 904 and the identified features 906, the trained machine-learning program 902 is trained during the training phase 908 during machine-learning program training 924. The machine-learning program training 924 appraises values of the features 906 as they correlate to the training data 904. The result of the training is the trained machine-learning program 902 (e.g., a trained or learned model).

Further, the training phase 908 may involve machine learning, in which the training data 904 is structured (e.g., labeled during preprocessing operations), and the trained machine-learning program 902 implements a relatively simple neural network 926 capable of performing, for example, classification and clustering operations. In other examples, the training phase 908 may involve deep learning, in which the training data 904 is unstructured, and the trained machine-learning program 902 implements a deep neural network 926 that is able to perform both feature extraction and classification/clustering operations.

A neural network 926, in some examples, is generated during the training phase 908, and implemented within the trained machine-learning program 902. The neural network 926 includes a hierarchical (e.g., layered) organization of neurons, with each layer including multiple neurons or nodes. Neurons in the input layer receive the input data, while neurons in the output layer produce the final output of the network. Between the input and output layers, there may be one or more hidden layers, each including multiple neurons.

Each neuron in the neural network 926 operationally computes a small function, such as an activation function that takes as input the weighted sum of the outputs of the neurons in the previous layer, as well as a bias term. The output of this function is then passed as input to the neurons in the next layer. If the output of the activation function exceeds a certain threshold, an output is communicated from that neuron (e.g., transmitting neuron) to a connected neuron (e.g., receiving neuron) in successive layers. The connections between neurons have associated weights, which define the influence of the input from a transmitting neuron to a receiving neuron. During the training phase, these weights are adjusted by the learning algorithm to optimize the performance of the network. Different types of neural networks may use different activation functions and learning algorithms, which can affect their performance on different tasks. Overall, the layered organization of neurons and the use of activation functions and weights enable neural networks to model complex relationships between inputs and outputs, and to generalize to new inputs that were not seen during training.

In some examples, the neural network 926 also is one of a number of different types of neural networks or a combination thereof, such as a single-layer feed-forward network, a Multilayer Perceptron (MLP), an Artificial Neural Network (ANN), a Recurrent Neural Network (RNN), a Long Short-Term Memory Network (LSTM), a Bidirectional Neural Network, a symmetrically connected neural network, a Deep Belief Network (DBN), a Convolutional Neural Network (CNN), a Generative Adversarial Network (GAN), an Autoencoder Neural Network (AE), a Restricted Boltzmann Machine (RBM), a Hopfield Network, a Self-Organizing Map (SOM), a Radial Basis Function Network (RBFN), a Spiking Neural Network (SNN), a Liquid State Machine (LSM), an Echo State Network (ESN), a Neural Turing Machine (NTM), or a Transformer Network, merely for example.

In addition to the training phase 908, a validation phase may be performed evaluated on a separate dataset known as the validation dataset. The validation dataset is used to tune the hyperparameters of a model, such as the learning rate and the regularization parameter. The hyperparameters are adjusted to improve the performance of the model on the validation dataset.

The neural network 926 is iteratively trained by adjusting model parameters to minimize a specific loss function or maximize a certain objective. The system can continue to train the neural network 926 by adjusting parameters based on the output of the validation, refinement, or retraining block 912, and rerun the prediction 910 on new or already run training data. The system can employ optimization techniques for these adjustments such as gradient descent algorithms, momentum algorithms, Nesterov Accelerated Gradient (NAG) algorithm, and/or the like. The system can continue to iteratively train the neural network 926 even after deployment 914 of the neural network 926. The neural network 926 can be continuously trained as new data emerges, such as based on user creation or system-generated training data.

Once a model is fully trained and validated, in a testing phase, the model may be tested on a new dataset that the model has not seen before. The testing dataset is used to evaluate the performance of the model and to ensure that the model has not overfit the training data.

In prediction phase 910, the trained machine-learning program 902 uses the features 906 for analyzing query data 928 to generate inferences, outcomes, or predictions, as examples of a prediction/inference data 922. For example, during prediction phase 910, the trained machine-learning program 902 is used to generate an output. Query data 928 is provided as an input to the trained machine-learning program 902, and the trained machine-learning program 902 generates the prediction/inference data 922 as output, responsive to receipt of the query data 928. Query data can include a prompt, such as a user entering a textual question or speaking a question audibly. In some cases, the system generates the query based on an interaction function occurring in the system, such as a user interacting with a virtual object, a user sending another user a question in a chat window, or an object detected in a camera feed.

In some examples the trained machine-learning program 902 is a generative AI model. Generative AI is a term that may refer to any type of artificial intelligence that can create new content from training data 904. For example, generative AI can produce text, images, video, audio, code or synthetic data that are similar to the original data but not identical.

Some of the techniques that may be used in generative AI are:

- Convolutional Neural Networks (CNNs): CNNs are commonly used for image recognition and computer vision tasks. They are designed to extract features from images by using filters or kernels that scan the input image and highlight important patterns. CNNs may be used in applications such as object detection, facial recognition, and autonomous driving.
- Recurrent Neural Networks (RNNs): RNNs are designed for processing sequential data, such as speech, text, and time series data. They have feedback loops that allow them to capture temporal dependencies and remember past inputs. RNNs may be used in applications such as speech recognition, machine translation, and sentiment analysis
- Generative adversarial networks (GANs): These are models that consist of two neural networks: a generator and a discriminator. The generator tries to create realistic content that can fool the discriminator, while the discriminator tries to distinguish between real and fake content. The two networks compete with each other and improve over time. GANs may be used in applications such as image synthesis, video prediction, and style transfer.

Variational autoencoders (VAEs): These are models that encode input data into a latent space (a compressed representation) and then decode it back into output data. The latent space can be manipulated to generate new variations of the output data. They may use self-attention mechanisms to process input data, allowing them to handle long sequences of text and capture complex dependencies.

Transformer models: These are models that use attention mechanisms to learn the relationships between different parts of input data (such as words or pixels) and generate output data based on these relationships. Transformer models can handle sequential data such as text or speech as well as non-sequential data such as images or code.

In generative AI examples, the prediction/inference data 922 that is output include trend assessment and predictions, translations, summaries, image or video recognition and categorization, natural language processing, face recognition, user sentiment assessments, advertisement targeting and optimization, voice recognition, or media content generation, recommendation, and personalization.

EXAMPLES

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a method performed by one or more hardware processors, the method comprising: receiving, by a large language model (LLM), a user input from a user comprising an audience request describing general attributes of a desired target audience; processing, by the LLM, the audience request to generate one or more structured audience characteristics that define identifiable traits, behaviors, or criteria associated with the desired target audience; receiving, from the user, a request to generate a structured query language (SQL) query based on the one or more structured audience characteristics; processing, by the LLM, the request to generate an SQL query based on the one or more structured audience characteristics; and executing the SQL query against a database comprising user identifiers to identify a subset of users corresponding to the desired target audience.

In Example 2, the subject matter of Example 1 includes, wherein the user input comprises a natural language text string submitted via a user interface, wherein the LLM processes the natural language text string to generate the one or more structured audience characteristics.

In Example 3, the subject matter of Examples 1-2 includes, wherein the audience request describes one or more intent-based characteristics of the desired target audience including a likelihood of purchasing a product or service type.

In Example 4, the subject matter of Examples 1-3 includes, wherein the audience request describes one or more purchase behaviors of the desired target audience.

In Example 5, the subject matter of Examples 1~4 includes, wherein the audience request describes one or more brand preferences of the desired target audience.

In Example 6, the subject matter of Examples 1-5 includes, generating, by the LLM, a second machine learning model, the second machine learning model being trained to generate the one or more structured audience characteristics based on the user input.

In Example 7, the subject matter of Examples 1-6 includes, generating, by the LLM, a second machine learning model, the second machine learning model being trained to generate the SQL query based on the user input.

In Example 8, the subject matter of Example 7 includes, wherein generating the second machine learning model further comprises training the second machine learning model using external source data associated with advertiser objectives, the external source data comprising one or more of: product metadata, campaign performance benchmarks, geographic focus areas, known audience cohort profiles, or purchase trends relevant to the desired target audience.

In Example 9, the subject matter of Examples 1-8 includes, accessing, by the LLM, external source data associated with an advertising entity, wherein the external source data includes one or more of: product category, geographic target region, customer personas, or historical campaign performance metrics; and wherein the LLM uses the external source data to assist in generating the one or more structured audience characteristics.

In Example 10, the subject matter of Examples 1-9 includes, wherein processing, by the LLM, the request to generate the SQL query further comprises using external data inputs selected from one or more of: historical purchase data, behavioral traits from user profiles, product sales performance by region, or third-party merchant data, to generate the SQL query corresponding to the one or more structured audience characteristics.

In Example 11, the subject matter of Examples 1-10 includes, wherein the SQL query generated by the LLM comprises a fully executable SQL string configured to be executed directly against the database comprising user identifiers without further modification.

In Example 12, the subject matter of Examples 1-11 includes, wherein the SQL query generated by the LLM comprises a parameterized SQL template including one or more placeholder fields for later population with specific values corresponding to user-defined audience characteristics.

In Example 13, the subject matter of Examples 1-12 includes, wherein the LLM is a single machine learning model that processes the audience request to generate the one or more structured audience characteristics, and processes the request to generate the SQL.

In Example 14, the subject matter of Examples 1-13 includes, wherein the LLM comprises a first LLM configured to process the audience request to generate the one or more structured audience characteristics, and a second LLM distinct from the first LLM, the second LLM being configured to processes the request to generate the SQL query.

In Example 15, the subject matter of Examples 1-14 includes, classifying the subset of users identified by the executed SQL query into a plurality of audience tiers based on a degree of match to the one or more structured audience characteristics, wherein each audience tier corresponds to a predicted conversion likelihood.

In Example 16, the subject matter of Examples 1-15 includes, transmitting the identified subset of users to an ad campaign deployment system for delivery of a digital advertising campaign to the identified subset.

Example 17 is a system comprising: at least one processor; and at least one memory component storing instructions that, when executed by the at least one processor, cause the at least one processor to perform operations comprising: receiving, by a large language model (LLM), a user input from a user comprising an audience request describing general attributes of a desired target audience; processing, by the LLM, the audience request to generate one or more structured audience characteristics that define identifiable traits, behaviors, or criteria associated with the desired target audience; receiving, from the user, a request to generate a structured query language (SQL) query based on the one or more structured audience characteristics; processing, by the LLM, the request to generate an SQL query based on the one or more structured audience characteristics; and executing the SQL query against a database comprising user identifiers to identify a subset of users corresponding to the desired target audience.

In Example 18, the subject matter of Example 17 includes, wherein the user input comprises a natural language text string submitted via a user interface, wherein the LLM processes the natural language text string to generate the one or more structured audience characteristics.

In Example 19, the subject matter of Examples 17-18 includes, wherein the audience request describes one or more intent-based characteristics of the desired target audience including a likelihood of purchasing a product or service type.

Example 20 is a non-transitory computer-readable storage medium storing instructions that, when executed by at least one processor, cause the at least one processor to perform operations comprising: receiving, by a large language model (LLM), a user input from a user comprising an audience request describing general attributes of a desired target audience; processing, by the LLM, the audience request to generate one or more structured audience characteristics that define identifiable traits, behaviors, or criteria associated with the desired target audience; receiving, from the user, a request to generate a structured query language (SQL) query based on the one or more structured audience characteristics; processing, by the LLM, the request to generate an SQL query based on the one or more structured audience characteristics; and executing the SQL query against a database comprising user identifiers to identify a subset of users corresponding to the desired target audience.

Example 21 is at least one machine-readable medium including instructions that, when executed by processing circuitry, cause the processing circuitry to perform operations to implement of any of Examples 1-20.

Example 22 is an apparatus comprising means to implement any of Examples 1-20.

Example 23 is a system to implement any of Examples 1-20.

Example 24 is a method to implement any of Examples 1-20.

CONCLUSION

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof.

Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

The various features, steps, and processes described herein may be used independently of one another, or may be combined in various ways. All possible combinations and subcombinations are intended to fall within the scope of this disclosure. In addition, certain method or process blocks may be omitted in some implementations.

In the example embodiments, it should be understood that the NFT system, the NFT system, and the various devices may be implemented in other manners. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments. In addition, functional units in the example embodiments may be integrated into one processing unit, or each of the units may exist alone physically, or two or more units may be integrated into one unit.

When the functions are implemented in the form of a software functional unit and sold or used as an independent product, the functions may be stored in a computer readable storage medium. Based on such an understanding, the technical solutions of example embodiments may be implemented in the form of a software product. The software product is stored in a storage medium, and includes several instructions for instructing a computing device to perform all or some of the steps or processes of the methods described in the example embodiments. The foregoing storage medium includes any medium that can store program code, such as a universal serial bus flash drive, removable hard disk, read only memory, random access memory, magnetic disc, and/or an optical disc.

In the described methods or block diagrams, boxes may represent events, steps, functions, processes, modules, messages, and/or state based operations, etc. While some of the example embodiments have been described as occurring in a particular order, some of the steps or processes may be performed in a different order provided that the result of the changed order of any given step will not prevent or impair the occurrence of subsequent steps. Furthermore, some of the messages or steps described may be removed or combined in other embodiments, and some of the messages or steps describe herein may be separated into a number of sub-messages or sub-steps in other embodiments. Even further, some or all of the steps may be repeated, as necessary. Elements described as methods, steps, or processes similarly apply to systems, subsystems, or subcomponents, and vice versa. Reference to such a word as sending or receiving could be interchanged depending on the perspective of the particulars device. The described embodiments are considered to be illustrative and not restrictive. Example embodiments described as methods would similarly apply to systems, subsystems, or devices, and vice versa.

The various example embodiments are merely examples and are in no way meant to limit the scope of this disclosure. Variations of the innovations describe herein will be apparent to persons of ordinary skill in the art, such variations being within the intended scope. In particular features from one or more of the example embodiments may be selected to create alternative embodiments comprised of a sub-combination of features which may not be explicitly described. In addition, features from one or more of the described example embodiments may be selected and combined to create alternative example embodiments comprised of a combination of features which may not be explicitly described. Features suitable for such combinations and sub-combinations would be readily apparent a person skilled in the art. The subject matter describe herein intends to cover all suitable changes in technology.

What is claimed is:

1. A method performed by one or more hardware processors, the method comprising:

receiving an audience request describing attributes of purchasing behavior of individuals of a desired target audience;

analyzing, using a large language model (LLM), the audience request to generate one or more structured audience characteristics that define identifiable traits, behaviors, or criteria associated with the desired target audience;

generating, using the same LLM that generated the one or more structured audience characteristics, a structured query language (SQL) query based on the one or more structured audience characteristics, the LLM generating the SQL query that includes syntactically valid executable SQL code;

executing the SQL query that includes the syntactically valid executable SQL code generated by the same LLM that generated the one or more structured audience characteristics and the structured SQL query, the executing of the SQL query causing an advertiser system to apply the structured audience characteristics against a user database comprising user identifiers to identify a subset of users corresponding to the desired target audience; and executing, by the same LLM that generated the one or more structured audience characteristics, generated the structured SQL query, and executed the SQL query, an ad campaign deployment system causing delivery of a digital advertising campaign to the identified subset.

2. The method of claim 1, wherein the audience request comprises a natural language text string submitted via a user interface of a computing device, wherein the LLM analyzes the natural language text string to generate the one or more structured audience characteristics, the natural language text string including text in unstructured free form.

3. The method of claim 1, wherein the audience request describes one or more intent-based characteristics of the desired target audience including a likelihood of purchasing a product or service type.

4. The method of claim 1, wherein the audience request describes one or more purchase behaviors of the desired target audience.

5. The method of claim 1, wherein the audience request describes one or more brand preferences of the desired target audience, the one or more brand preferences corresponding to a merchant providing products or services to stores, the one or more brand preferences being inputted into the LLM to generate the one or more structured audience characteristics, the one or more brand preferences including a brand affinity score indicative of a frequency of a user completing a purchase with a particular brand merchant.

6. The method of claim 1, further comprising generating, by the LLM, a second machine learning model, the LLM using the desired target audience to generate the second machine learning model that is configured to generate the one or more structured audience characteristics based on the audience request, wherein the LLM is a different machine learning model than the second machine learning model.

7. The method of claim 1, further comprising generating, by the LLM, a second machine learning model, the LLM using the one or more structured audience characteristics to generate the second machine learning model that is configured to generate the SQL query based on the audience request, wherein the LLM is a different machine learning model than the second machine learning model.

8. The method of claim 7, wherein generating the second machine learning model further comprises training the second machine learning model using external source data associated with advertiser objectives, the external source data comprising one or more of: product metadata, campaign performance benchmarks, geographic focus areas, known audience cohort profiles, or purchase trends relevant to the desired target audience.

9. The method of claim 1, further comprising accessing, by the LLM, external source data associated with an advertising entity, the external source data comprising one or more of: product category, geographic target region, customer personas, or historical campaign performance metrics; and wherein the LLM analyzes the data to generate the one or more structured audience characteristics.

10. The method of claim 1, wherein generating the SQL query further comprises using one or more of: historical purchase data, behavioral traits from user profiles, product sales performance by region, or third-party merchant data, to generate the SQL query corresponding to the one or more structured audience characteristics.

11. The method of claim 1, wherein the SQL query generated by the LLM comprises an executable SQL string configured to be executed directly against the database comprising user identifiers without further modification.

12. The method of claim 1, wherein the SQL query generated by the LLM comprises a parameterized SQL template including one or more placeholder fields for later population with specific values corresponding to user-defined audience characteristics.

13. The method of claim 1, wherein the LLM is a single machine learning model that processes the audience request to generate the SQL.

14. The method of claim 1, wherein the LLM comprises a first LLM configured to generate the one or more structured audience characteristics from an audience request, and a second LLM configured to generate the SQL query.

15. The method of claim 1, further comprising:

classifying the subset of users identified by the executed SQL query into a plurality of audience tiers based on a degree of match to the one or more structured audience characteristics, wherein each audience tier corresponds to a predicted conversion likelihood.

16. The method of claim 1, further comprising transmitting the identified subset of users to an ad campaign deployment system for delivery of a digital advertising campaign to the identified subset.

17. A system comprising:

at least one processor; and at least one memory component storing instructions that, when executed by the at least one processor, cause the at least one processor to perform operations comprising:

receiving an audience request describing attributes of purchasing behavior of individuals of a desired target audience;

analyzing, using a large language model (LLM), the audience request to generate one or more structured audience characteristics that define identifiable traits, behaviors, or criteria associated with the desired target audience;

generating, using the same LLM that generated the one or more structured audience characteristics, a structured query language (SQL) query based on the one or more structured audience characteristics, the LLM generating the SQL query that includes syntactically valid executable SQL code;

executing the SQL query that includes the syntactically valid executable SQL code generated by the same LLM that generated the one or more structured audience characteristics and the structured SQL query, the executing of the SQL query causing an advertiser system to apply the structured audience characteristics against a user database comprising user identifiers to identify a subset of users corresponding to the desired target audience; and executing, by the same LLM that generated the one or more structured audience characteristics, generated the structured SQL query, and executed the SQL query, an ad campaign deployment system causing delivery of a digital advertising campaign to the identified subset.

18. The system of claim 17, wherein the audience request comprises a natural language text string submitted via a user interface, wherein the LLM processes the natural language text string to generate the one or more structured audience characteristics.

19. The system of claim 17, wherein the audience request describes one or more intent-based characteristics of the desired target audience including a likelihood of purchasing a product or service type.

20. A non-transitory computer-readable storage medium storing instructions that, when executed by at least one processor, cause the at least one processor to perform operations comprising:

receiving an audience request describing attributes of purchasing behavior of individuals of a desired target audience;

analyzing, using a large language model (LLM), the audience request to generate one or more structured audience characteristics that define identifiable traits, behaviors, or criteria associated with the desired target audience;

generating, using the same LLM that generated the one or more structured audience characteristics, a structured query language (SQL) query based on the one or more structured audience characteristics, the LLM generating the SQL query that includes syntactically valid executable SQL code;

executing the SQL query that includes the syntactically valid executable SQL code generated by the same LLM that generated the one or more structured audience characteristics and the structured SQL query, the executing of the SQL query causing an advertiser system to apply the structured audience characteristics against a user database comprising user identifiers to identify a subset of users corresponding to the desired target audience; and executing, by the same LLM that generated the one or more structured audience characteristics, generated the structured SQL query, and executed the SQL query, an ad campaign deployment system causing delivery of a digital advertising campaign to the identified subset.

* * * * *